(12) United States Patent
Shakarchi et al.

(10) Patent No.: US 8,639,606 B1
(45) Date of Patent: Jan. 28, 2014

(54) METHODS AND SYSTEMS FOR PROVIDING INTEREST RATE INDICES AND NOTES

(75) Inventors: Rami Shakarchi, London (GB);
Jonathan Rogers, London (GB);
Laurent Marsan, London (GB)

(73) Assignee: Barclays Capital Inc., New York, NY (US)

( * ) Notice: Subject to any disclaimer, the term of this patent is extended or adjusted under 35 U.S.C. 154(b) by 526 days.

(21) Appl. No.: 12/422,627

(22) Filed: Apr. 13, 2009
(Under 37 CFR 1.47)

Related U.S. Application Data

(60) Provisional application No. 61/044,759, filed on Apr. 14, 2008.

(51) Int. Cl.
*G06Q 40/00* (2012.01)

(52) U.S. Cl.
USPC ............... 705/37; 705/36 R; 705/35; 705/30; 705/1.1

(58) Field of Classification Search
USPC ............... 705/1.1, 37, 36 R, 35, 30, 38, 26.1; 707/739, 706, 713; 709/229, 223, 231
See application file for complete search history.

(56) References Cited

U.S. PATENT DOCUMENTS

2002/0010670 A1 * 1/2002 Mosler et al. .................. 705/37
2006/0259378 A1 * 11/2006 Fornasari ....................... 705/35

* cited by examiner

*Primary Examiner* — John H Holly
(74) *Attorney, Agent, or Firm* — Morgan Lewis & Bockius LLP

(57) ABSTRACT

In one aspect, the present invention comprises a method comprising: receiving data regarding bank rates and swap rates for two or more currencies; calculating a swap curve for each of the currencies; calculating signals for each of the swap curves; and based on the signals, taking a position with respect to each of the swap curves and currencies. In various embodiments, the method further comprises calculating a sub-index value for each of the currencies, the sub-index values based on returns for the positions; and weighting each sub-index value and calculating a value for an index, based on a combination of the sub-index values. In another aspect, the invention comprises: receiving data regarding the index; calculating a performance value for the index to be used in a derivative based on the index; and calculating an amount due to, or owed by, an investor in the derivative, based on the performance value.

40 Claims, 10 Drawing Sheets

Correlation = -76%

Historical Analysis

- We analyse the performance (net of fees with Euribor flat issuer) of a 8-year investment assuming that on each month of the backtesting period an equal amount is invested in the *Global* COMPASS note and a vanilla floater.

METHODS AND SYSTEMS FOR PROVIDING INTEREST RATE INDICES AND NOTES

CROSS REFERENCE TO RELATED APPLICATIONS

This application claims priority to U.S. Provisional Patent Application No. 61/044,759, filed Apr. 14, 2008. The entire contents of that provisional application are incorporated herein by reference.

INTRODUCTION

Exemplary embodiments of the present invention are referred to herein as "Global COMPASS" or "Global Compass." These embodiments aim to capture momentum in the slope of swap curves as signaled by dynamics in monetary policy regimes. The swap curve is the yield curve used to price interest rate swaps, reflecting both the general level of risk-free interest rates and the credit spread or swap spread in the interbank market attributable to the credit risk of default over the life of the swap.

Related embodiments comprise a Global COMPASS Index, which offers an attractive risk/return profile for investors: (a) a historical Sharpe Ratio of 1.15 since 1991 (after hedging costs) for at least one embodiment; (b) low historical correlation with asset class benchmarks to enhance portfolio diversification; and (c) maximum transparency: the Index is published daily on Bloomberg.

In one aspect, the present invention comprises a computer-implemented method comprising: (a) receiving with a first computer data regarding bank rates and swap rates for two or more currencies; (b) calculating with a second computer a swap curve for each of the two or more currencies; (c) calculating with a third computer one or more signals for each of the swap curves; and (d) based on the one or more signals, taking a position with respect to each of the swap curves and currencies, wherein the computers may be the same computer or different computers. In various embodiments: (1) the method further comprises calculating with a fourth computer a sub-index value for each of the currencies, the sub-index values based on returns for the positions; (2) the method further comprises weighting each of the sub-index values and calculating a value for an index, based on a combination of the sub-index values; (3) the weighting is based on relative gross domestic product values; (4) each signal is based on an average of a plurality of monetary policy indicators; (5) each of the monetary policy indicators has the value +1 or −1; (6) at least one of the monetary policy indicators is based on change in central bank target rate for a corresponding currency over a specified period of time; (7) at least one of the monetary policy indicators is a monetary policy surprise indicator; (8) each swap curve is based on data for a plurality of swap rates; (9) the data for the plurality of swap rates comprises 10 year swap rate data and 2 year swap rate data; (10) the signals are calculated on a weekly basis; and (11) the currencies comprise United States dollar, Euro, British pound, Japanese yen, and Canadian dollar.

In another aspect, the invention comprises a computer-implemented method comprising: (a) receiving with a first computer data regarding the above index; (b) calculating with a second computer a performance value for the index to be used in a derivative based on the index; and (c) calculating with a third computer an amount due to, or owed by, an investor in the derivative, based on the performance value, wherein the computers may be the same computer or different computers. In various embodiments: (1) the derivative is a total return swap; (2) the derivative combines a floating rate investment of limited duration risk with a leveraged exposure to the index; (3) the derivative comprises a liability structure; (4) the derivative comprises a constant proportion portfolio insurance note; (5) the derivative comprises a Euro medium term note; and (6) the derivative comprises a UCITS-compliant note.

In another aspect, the invention comprises an apparatus comprising a computer readable medium that stores data describing a derivative product based on an index, the index constructed by steps comprising: (a) receiving with a first computer data regarding bank rates and swap rates for two or more currencies; (b) calculating with a second computer a swap curve for each of the two or more currencies; (c) calculating with a third computer one or more signals for each of the swap curves; (d) based on the one or more signals, taking a position with respect to each of the swap curves and currencies; (e) calculating with a fourth computer a sub-index value for each of the currencies, the sub-index values based on returns for the positions; and (f) weighting each of the sub-index values and calculating a value for the index, based on a combination of the sub-index values, wherein the computers may be the same computer or different computers. In various embodiments: (1) the derivative product is a total return swap; (2) the derivative product combines a floating rate investment of limited duration risk with a leveraged exposure to the index; (3) the derivative comprises a liability structure; (4) the derivative product comprises a constant proportion portfolio insurance note; (5) the derivative product comprises a Euro medium term note; and (6) the derivative product comprises a UCITS-compliant note.

In another aspect, the invention comprises a computer system comprising: (a) a processor that electronically receives data regarding bank rates and swap rates for two or more currencies; (b) a processor that electronically calculates a swap curve for each of the two or more currencies; (c) a processor that electronically calculates one or more signals for each of the swap curves; and (d) a processor that electronically, based on the one or more signals, takes a position with respect to each of the swap curves and currencies, wherein the processors may be the same processor or different processors. In various embodiments: (1) the system further comprises a processor that calculates a sub-index value for each of the currencies, the sub-index values based on returns for the positions; (2) the system further comprises a processor that weights each of the sub-index values and calculates a value for an index, based on a combination of the sub-index values; (3) weighting is based on relative gross domestic product values; (4) each signal is based on an average of a plurality of monetary policy indicators; (5) each of the monetary policy indicators has the value +1 or −1; (6) at least one of the monetary policy indicators is based on change in central bank target rate for a corresponding currency over a specified period of time; (7) at least one of the monetary policy indicators is a monetary policy surprise indicator; (8) each swap curve is based on data for a plurality of swap rates; (9) the data for the plurality of swap rates comprises 10 year swap rate data and 2 year swap rate data; (10) the signals are calculated on a weekly basis; and (11) the currencies comprise United States dollar, Euro, British pound, Japanese yen, and Canadian dollar.

In another aspect, the invention comprises a computer system comprising: (a) a processor that receives data regarding an index as described above; (b) a processor that calculates a performance value for the index to be used in a derivative based on the index; and (c) a processor that calculates an amount due to, or owed by, an investor in the derivative, based on the performance value, wherein the processors may be the same processor or different processors. In various embodiments: (1) the derivative is a total return swap; (2) the derivative combines a floating rate investment of limited duration risk with a leveraged exposure to the index; (3) the derivative comprises a liability structure; (4) the derivative comprises a constant proportion portfolio insurance note; (5) the derivative comprises a Euro medium term note; and (6) the derivative comprises a UCITS-compliant note.

In another aspect, the invention comprises a program storage device readable by a machine, tangibly embodying a program of instructions executable by the machine to perform method steps comprising: (a) receiving with a first computer data regarding bank rates and swap rates for two or more currencies; (b) calculating with a second computer a swap curve for each of the two or more currencies; (c) calculating with a third computer one or more signals for each of the swap curves; and (d) based on the one or more signals, taking a position with respect to each of the swap curves and currencies, wherein the computers may be the same computer or different computers. In various embodiments: (1) the method steps further comprise calculating with a fourth computer a sub-index value for each of the currencies, the sub-index values based on returns for the positions; (2) the method steps further comprise weighting each of the sub-index values and calculating a value for an index, based on a combination of the sub-index values; (3) the weighting is based on relative gross domestic product values; (4) each signal is based on an average of a plurality of monetary policy indicators; (5) each of the monetary policy indicators has the value +1 or −1; (6) at least one of the monetary policy indicators is based on change in central bank target rate for a corresponding currency over a specified period of time; (7) at least one of the monetary policy indicators is a monetary policy surprise indicator; (8) each swap curve is based on data for a plurality of swap rates; (9) the data for the plurality of swap rates comprises 10 year swap rate data and 2 year swap rate data; (10) the signals are calculated on a weekly basis; and (11) the currencies comprise United States dollar, Euro, British pound, Japanese yen, and Canadian dollar.

In another aspect, the invention comprises a program storage device readable by a machine, tangibly embodying a program of instructions executable by the machine to perform method steps comprising: (a) receiving with a first computer data regarding an index as described above; (b) calculating with a second computer a performance value for the index to be used in a derivative based on the index; and (c) calculating with a third computer an amount due to, or owed by, an investor in the derivative, based on the performance value, wherein the computers may be the same computer or different computers. In various embodiments: (1) the derivative is a total return swap; (2) the derivative combines a floating rate investment of limited duration risk with a leveraged exposure to the index; (3) the derivative comprises a liability structure; (4) the derivative comprises a constant proportion portfolio insurance note; (5) the derivative comprises a Euro medium term note; and (6) the derivative comprises a UCITS-compliant note.

These and other aspects and embodiments will be apparent to those skilled in the art upon reviewing the description below.

DETAILED DESCRIPTION OF EXEMPLARY EMBODIMENTS

Figure 1:
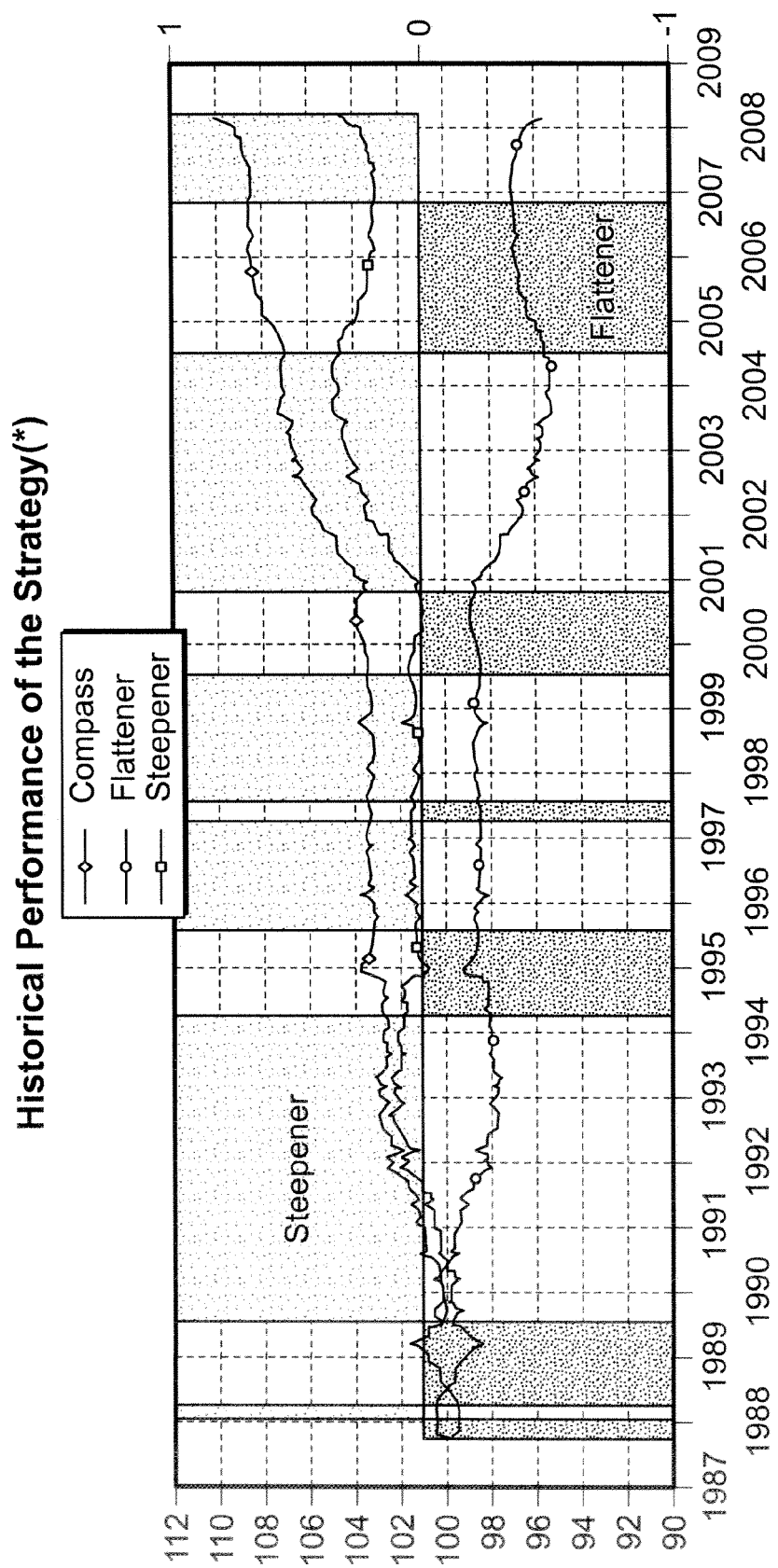
FIG. 1 depicts historical performance of an exemplary U.S. Compass strategy.

Exemplary embodiments of the present invention are described in detail below.

Investors usually face a difficult choice between passive and active investment management: (a) investments based upon static market views may achieve poor performance during certain rate cycles or changes in rate cycles; and (b) the management cost in actively managed funds can be high and the regulatory treatment of such investments is not always optimal. A cost effective alternative is to invest in a dynamic strategy that changes according to the yield curve environment.

The U.S. COMPASS (or simply COMPASS, or Compass) Index is a liquid index based on a dynamic investment strategy that automatically adjusts itself over time in response to changes in the market. The underlying strategy is a steepener/flattener position on the US curve that is contingent on the changes in the Fed Funds rate.[1] The Index preferably is structured so as to offer minimal duration. The COMPASS Index is published on Bloomberg to offer maximum transparency to investors.

[1] The yield curve is said to flatten when yields of shorter maturities rise relative to yields of longer maturities, and to steepen when yields of short maturities fall relative to yields of long maturities. Since short-term rates are always less than long-term rates, flattening means the two types of rates are converging, and steepening means the two types of rates are diverging—i.e., the spread is increasing.

The COMPASS Note is a EUR-denominated note with a dynamic allocation mechanism that gives participation in the COMPASS Index and provides enhanced returns through leverage while providing full capital protection. The note has historically outperformed Vanilla floater and offered low correlation with other fixed income asset classes.

COMPASS Index

The COMPASS Index invests in a USD steepener when the Fed Funds Target rate is falling (easing cycle) or a USD flattener strategy when the Fed Funds Target rate is increasing (tightening cycle).

Index Methodology

The COMPASS Index involves entering into a duration-weighted pair of USD forward-starting 10-year and 2-year swaps according to the evolution of the Fed Funds target rate. By choosing the Fed Funds target rate as a condition, the index captures changes in US monetary policy. The steepening/flattening Position for any quarter is conditional on the change in the Fed Funds rate during the previous 3-month period as defined below:

TABLE 1

| Position | Curve View | Condition |
| --- | --- | --- |
| +1 | Steepening | Fed Funds$_t$ ≤ Fed Funds$_{t-3m}$ ("Easing Cycle") |
| −1 | Flattening | Fed Funds$_t$ > Fed Funds$_{t-3m}$ ("Tightening Cycle") |

For any day t within a Calculation Period, Index$_t$ is calculated by taking the Index at the end of the previous period, and multiplying it by a factor equal to:
One, plus the product of the Position (as defined above); the EUR/USD exchange rate at the start of the period divided by the EUR/USD exchange rate at day t; and the change in the 10y USD Swap less the change in the 2y USD Swap (duration-weighted; the forwards versus the actual rates).

Historical COMPASS Index Performance

The COMPASS strategy would have outperformed standard Steepener or Flattener strategies in the past. FIG. 1 compares the performance of a Standard Steepener, a Standard Flattener and the COMPASS index from October 1987. The COMPASS strategy would have outperformed the other two strategies for most of the sample period. The indices show the return on a derivative-based strategy hence they do not include any accretion at Euribor. See FIG. 1.

COMPASS and Benchmark Asset Class Indices

Figure 2:
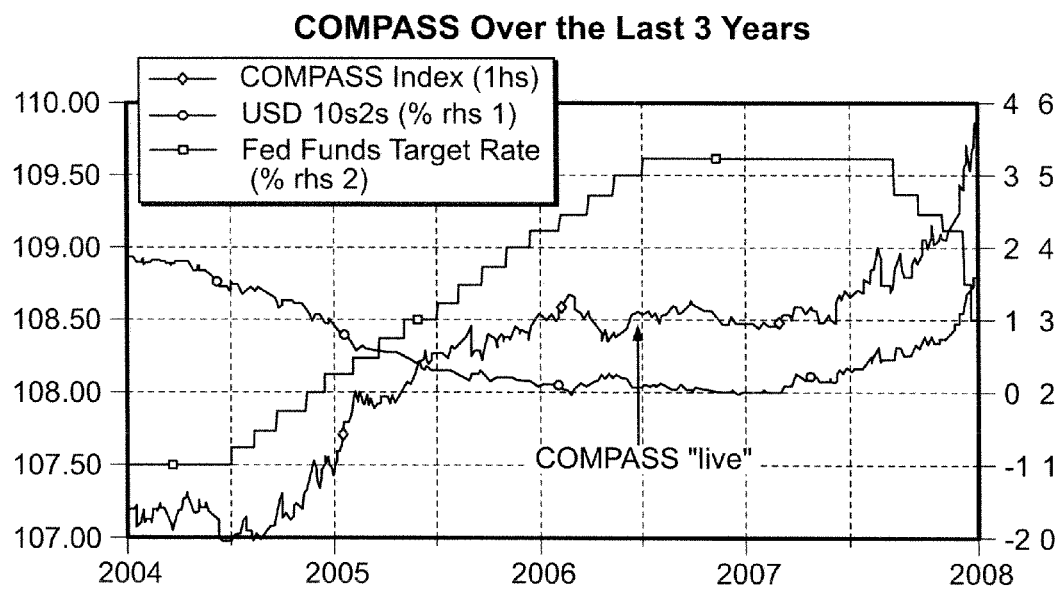
FIG. 2 depicts U.S. Compass performance over three years.

COMPASS has offered high return-to-risk and diversification benefits. Judging by risk adjusted historical returns, COMPASS has performed well in comparison to benchmark equity and fixed income asset class indices. COMPASS has also exhibited low correlation to these asset classes across business cycles. See FIG. 2.

COMPASS Note, the Capital is equal to 100% of the Nominal. The Capital at the end of any calculation period "k" is then calculated as follows:

Capital at the Beginning Growing at the 3-Month Euribor Rate:

$$\text{Capital}_{k-1} \times (1 + (3m \text{ EURIBOR} + \text{spread}) \times \text{Daycount Fraction}_k)$$

+

Leveraged Return Earned on the Capital Allocated to the Strategy:

$$\text{Capital}_{k-1} \times \text{Exposure}_k \times \text{Performance}_k$$

−

An Administrative Fee of 1.00% Per Annum:

$$\text{Administration Fee} \times \text{Daycount Fraction}_k$$

The Capital at the beginning of an Allocation period is then set equal to the Capital at the end of the immediately preceding Allocation Period. The Exposure is a function of the performance of the strategy during the preceding calculation period. It is described in further detail below. The Performance of the strategy during a calculation period is defined as the percentage return on the index over that quarter less the roll cost of 0.01% (representing the cost of changing the dynamic allocation).

Dynamic Allocation Mechanism

The dynamic allocation mechanism protects the value of the investment while enhancing the returns during periods of high index returns. The core principle of this mechanism is that the percentage allocated to the strategy is a function of the performance. If the strategy performs well, the Exposure is increased providing a higher leverage. If the performance decreases, the Exposure is reduced and under extreme scenarios, positions in the strategy might be totally unwound to preserve the capital guarantee at maturity.

The Exposure to the strategy at the beginning of any calculation period is defined as the product of the Multiplier and the Allocation. The Allocation is defined as the leveraged

TABLE 2

| | Historical Average Excess Returns* | | | | | |
| --- | --- | --- | --- | --- | --- | --- |
| | Lehman US Agg Index | Lehman Euro Agg Index | S&P 500 Index | DJ EuroStoxx 50 Index | Tremont Hedge Fund Index | COMPASS Index |
| Annual return | 2.47% | 1.76% | 6.66% | 6.01% | 6.29% | 0.48% |
| Annual st. dev. | 3.86% | 3.04% | 13.55% | 18.43% | 7.46% | 0.55% |
| Sharpe Ratio | 0.64 | 0.58 | 0.49 | 0.33 | 0.84 | 0.88 |
| Correlation with COMPASS | −0.03 | 0.05 | −0.20 | −0.17 | −0.17 | — |

*Calculations are based on monthly data from January 1988 (or as far back as availalbe). Source: Bloomberg, Lehman Brothers calculations.

COMPASS Note

The COMPASS Note offers a structured participation on the COMPASS Index using a dynamic allocation approach. The redemption amount for the note is equal to 100% plus any coupon payable at maturity date. At the inception of the COMPASS Note, the Capital is equal to 100% of the Nominal.

difference between the value of the Note and the Barrier. The Barrier represents at inception the present value of the guaranteed amount at maturity. This Barrier is fixed and rises linearly to 100% over the life of the note. The Barrier has therefore the appealing feature of being insensitive to interest rate movements.

Example of the Dynamic Allocation Mechanism

Exposure=Multiplier×Allocation

Multiplier=25

Figure 3:
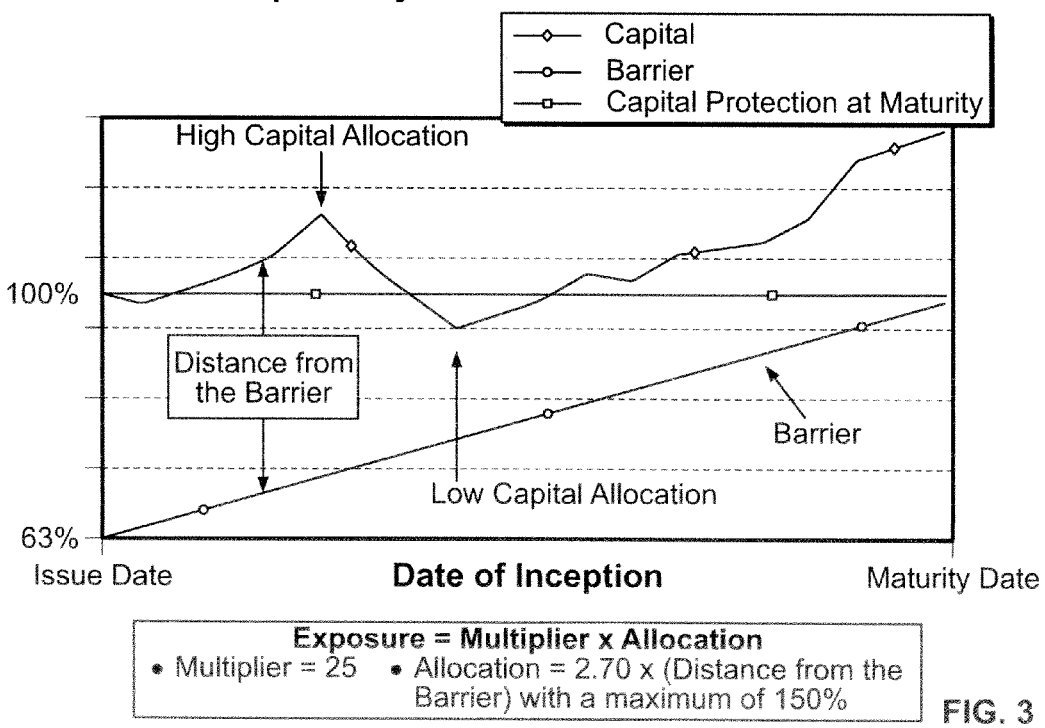
FIG. 3 depicts an exemplary dynamic allocation mechanism.

Allocation=2.70×(Distance from the Barrier) with a maximum of 150%. See FIG. 3.

Historical Performance Analysis

Figure 4:
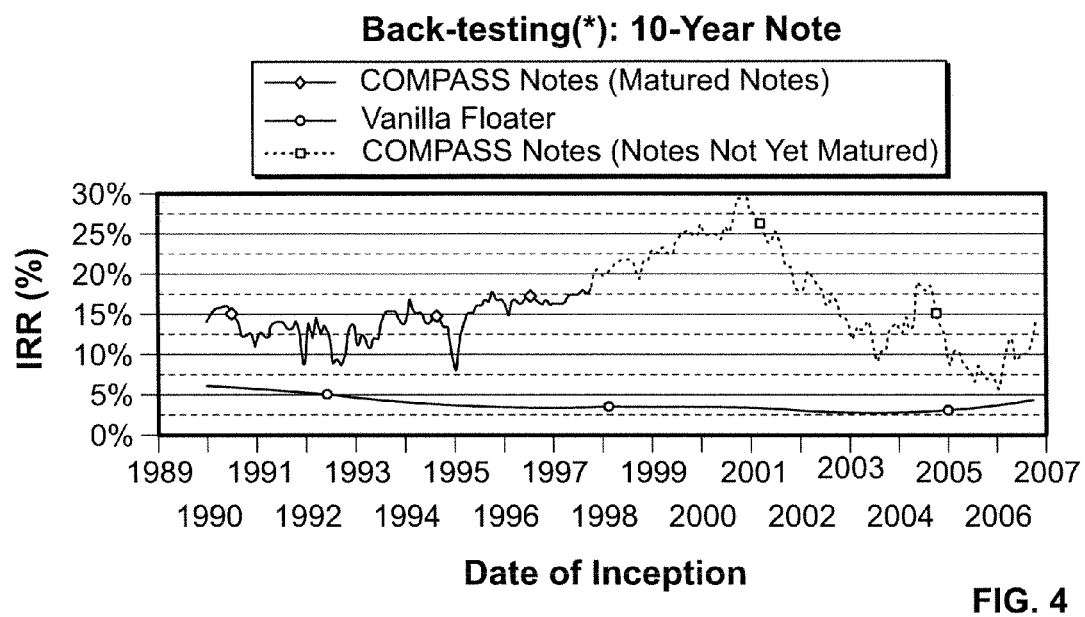
FIG. 4 illustrates back-testing results.

The COMPASS Note would have outperformed a vanilla note over most periods. The performance has been analyzed (net of fees with Euribor flat issuer) of a 10y investment assuming that on each month of the back-testing period an equal amount is invested in the COMPASS note (as described above) and a Vanilla Floater. See FIG. 4.

TABLE 3

|  | COMPASS Matured Notes | COMPASS Total Notes | Vanilla Floater (%) |
|---|---|---|---|
| Average Returns | 14.33% | 16.17% | 3.63% |
| Min. return | 7.80% | 5.62% | 2.70% |
| Max. return | 18.18% | 30.47% | 6.03% |

(*) For notes issued after November 1997 we show the realized IRR until November 2007. No suspension Events occurred on any of the backtested notes. The last note used in the backtest was issued in November 2006 to ensure that we have at least 12 months of data for the calculation of the IRR. Backtesting for short periods is less indicative of the performance of a 10-year note and more susceptible to variations which could be unrepresentative. For assumptions on the back-testing see below.

COMPASS Note Structure—Exemplary Indicative Terms of 10-Year Restructured COMPASS Note:

| | |
|---|---|
| Principal: | € 10 m minimum |
| Tenor: | 10 years |
| Issuer: | Lehman Brothers Treasury Co BV |
| Issue Price: | 100% |
| Coupon: | Coupon = 0%. Alternative coupon paying structures available |
| Redemption: | The greater of 100% and the Capital value of the Notes The redemption price is subject to the Suspension Event |
| Suspension: | If on any day t, (Capital$_t$ − Barriers$_t$) is lower than 5%, a Suspension Event will be deemed to have occurred, in which all open positions in the strategy will be closed and the Allocation will be deemed to be zero from that point onwards |
| Allocation Period: | Quarterly, from and including one Allocation Date to and including the immediately following Allocation Date |
| Administration Fee: | 1.00% per annum at all times |
| Performance Fee: | None |

Summary of U.S. COMPASS

Investment Strategy

Historically, the USD forward curve tends to over-predict flattening suggesting that a steepening strategy would be profitable over long periods. However the slope of the curve is highly negatively correlated with the level of Fed Funds rate. COMPASS Index takes the advantages of these relationships to allow the investor to benefit in differing rate cycles.

Note Format

The structure could be classified as a bond rather than an investment in a hedge fund even though it employs strategies adopted by hedge funds, thus achieving greater transparency, favorable accounting and regulatory treatment Market Access The note provides an opportunity for investors who can not easily access markets to implement dynamic strategies and a minimum coupon Note Performance The dynamic allocation mechanism further enhances the return on the note by leveraging the returns while providing full capital protection The note has been structured so as to have minimal duration (other than via the Strategy itself and the minimum coupon)

The note has historically outperformed a comparable vanilla structure particularly over the last few years Downside Scenario Possible breakdown of relationship between slope and the level of the curve could lead to underperformance of the Index and a complete de-leveraging of the Notes in the worst case resulting in a redemption at only 100%.

Glossary

Index Position

The Index Position determines whether the Index is on a steepener or a flattener strategy. It is set to +1 if the Fed Funds rate decreased or remained the same during the previous 3-month period. In this case, the Index is a steepener. It is set to −1 if the Fed Funds rate increases during the previous 3-month period. In this case it is a flattener.

Capital

The Capital is equal to 100% at inception and increases during subsequent quarters at Euribor plus or minus the performance of the index, less the fees.

Redemption Amount

The Redemption Amount is the Capital at maturity with a minimum redemption of 100%

Multiplier

The Multiplier factor is a constant factor equal to 25. The Multiplier is multiplied by the Allocation to calculate the leveraged return on the strategy.

Allocation

The Allocation is the percentage of the Capital (prior to any additional leverage) that is invested in the strategy. The Allocation at the beginning of any quarter "k" is calculated as:

$$\text{Allocation}_k = 2.70 \times \left[ \frac{\text{Capital} - \text{Barrier}}{\text{Capital}} \right].$$

Barrier

The Barrier is a pre-determined percentage that only changes with time. It does not vary with interest rate movements and is an essential element of the Dynamic Allocation mechanism to provide the capital protection at maturity $$\text{Barrier}_t = \text{Barrier}_0 + \left[ (1 - \text{Barrier}_0) \times \frac{t}{T} \right].$$

Where

T is the Total number of days from the initial allocation date to but excluding the final allocation date Barrier$_0$ is the level of the Barrier at inception Exemplary Methodology and Assumptions Index Back-Testing Assumptions Details of source:

Money market rates: British Bankers Association fixings provided by Bloomberg

Fed Funds: Federal Reserve provided by Bloomberg

Swap rates: ISDA fixings until October 1998, Lehman-Live from 1987 to October 1998. Historical data for the 12-year swap rate was not available before November 1993. A synthetic rate has been created by assuming a linear interpolation between the 10-year swap rate and the 30-year swap rate (closest maturity available). When the 30-year swap rate was not available, we have carried out a linear interpolation between the 10-year Treasury and the 30-year Treasury and then have adjusted by the asset-swap spread Forward rates have been determined by Lehman Brothers proprietary systems using historical swap curves COMPASS Note Back-Testing The internal rate of return (IRR) for a vanilla floater is defined as the interest rate at which the net present value of the cash flows received (quarterly 3-month Euribor cash flows plus redemption amount) equals the issue price The back-testing of the Compass Notes have been carried out on a monthly basis assuming that on each month of the back-testing period an equal amount is invested in the Compass note and a Vanilla Floater. The data and graph on this presentation are based on the IRR of theses returns for each month.

For backtested notes we evaluated whether a suspension event occurred on each of the roll dates. The analysis found that no suspension event occurred on any of the roll dates of historically backtested notes.

The value of the barrier for historically issued Notes is determined by using the yield curve as of the Note issue date (source: LehmanLive—data missing are omitted)

For notes issued after November 1997 we show the realized IRR until November 2007. The last note used in the backtest was issued in November 2006 to ensure that we have at least 12 months of data for the calculation of the IRR. Backtesting for short periods is less indicative of the performance of a 10-year note and more susceptible to variations which could be unrepresentative.

Global COMPASS

Exemplary embodiments of the present invention comprise a Global COMPASS Index and/or a Global COMPASS Note. Global COMPASS is based on a dynamic investment strategy based on the slopes of swap curves. A wide range of formats is available to best suit the needs of investors: for example, CPPI, OTC Swaps, and UCITS III.

Exemplary Global COMPASS Strategy

Figure 5:
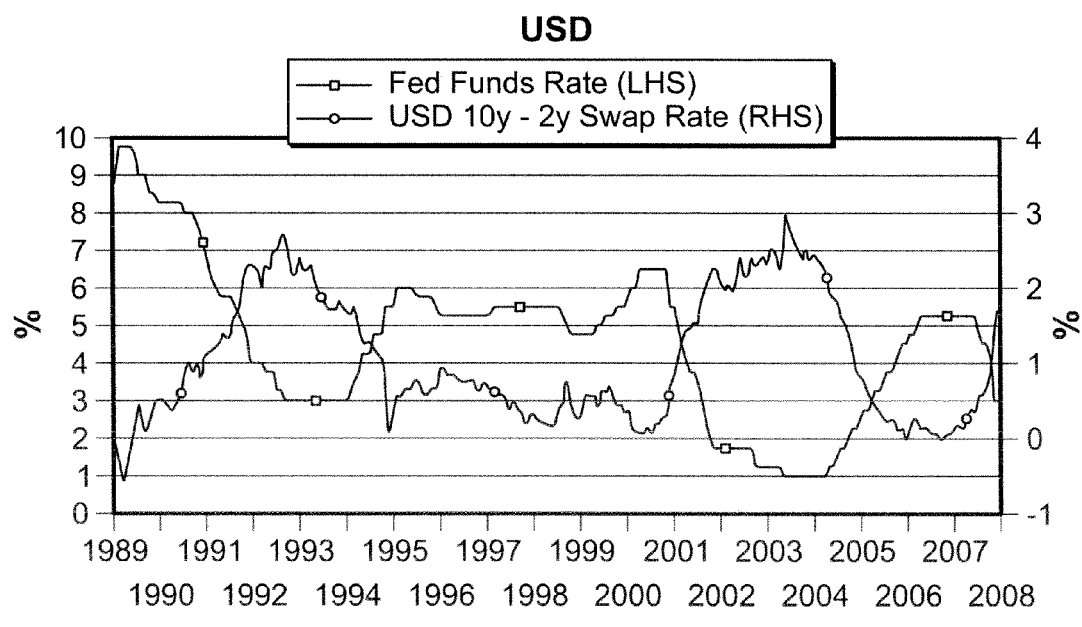
FIG. 5 depicts negative correlation of Fed Funds rate and USD swap curve slope.
Figure 6:
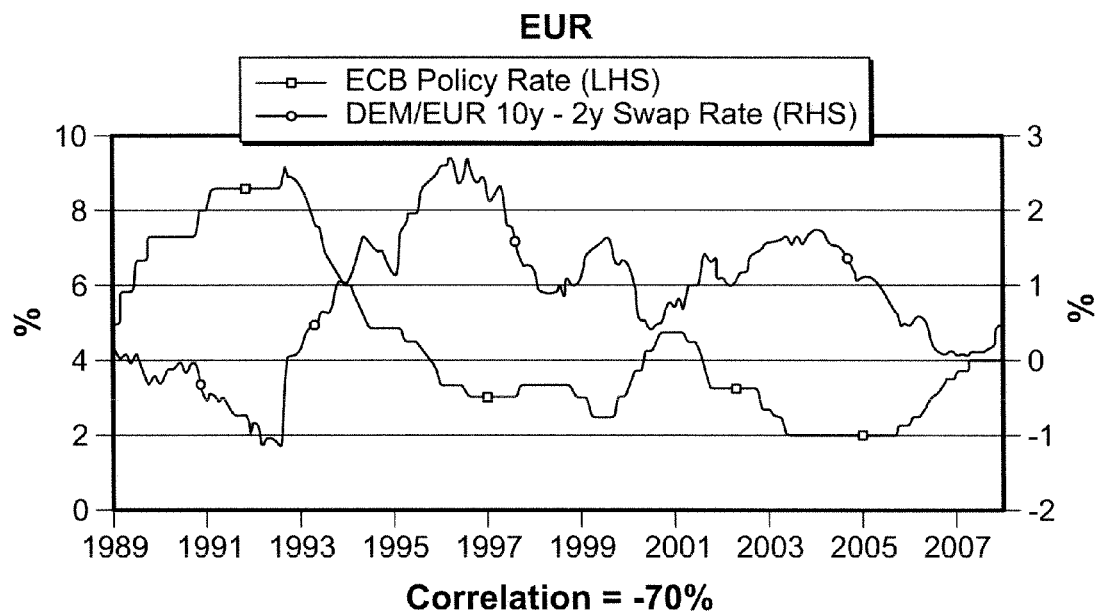
FIG. 6 depicts negative correlation of ECB policy rate and EUR swap curve slope.
Figure 7:
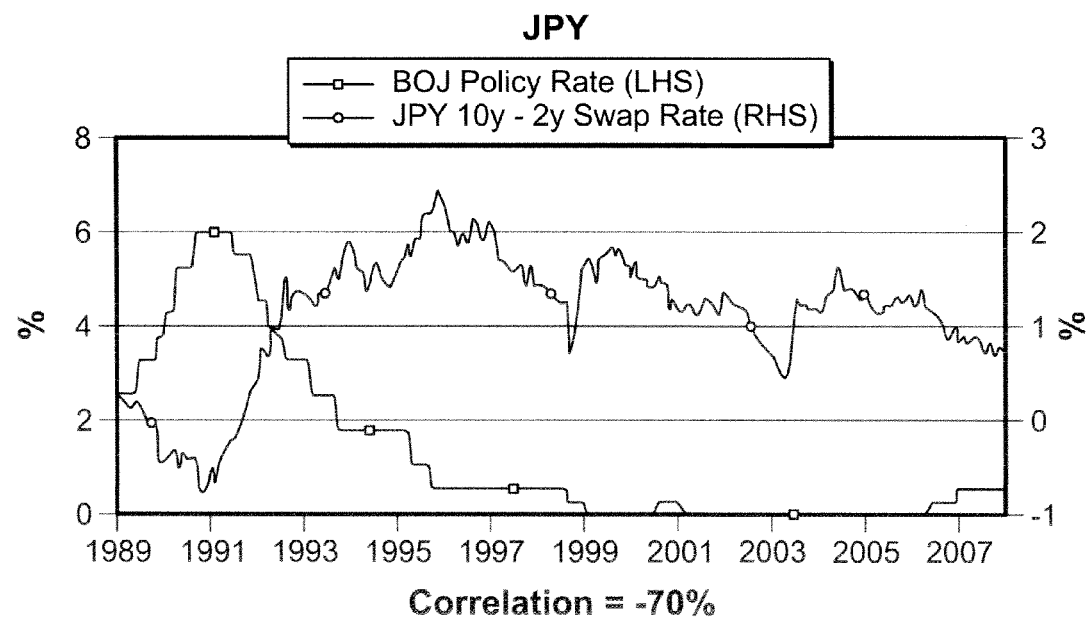
FIG. 7 depicts negative correlation of BOJ policy rate and JPY swap curve slope.
Figure 8:
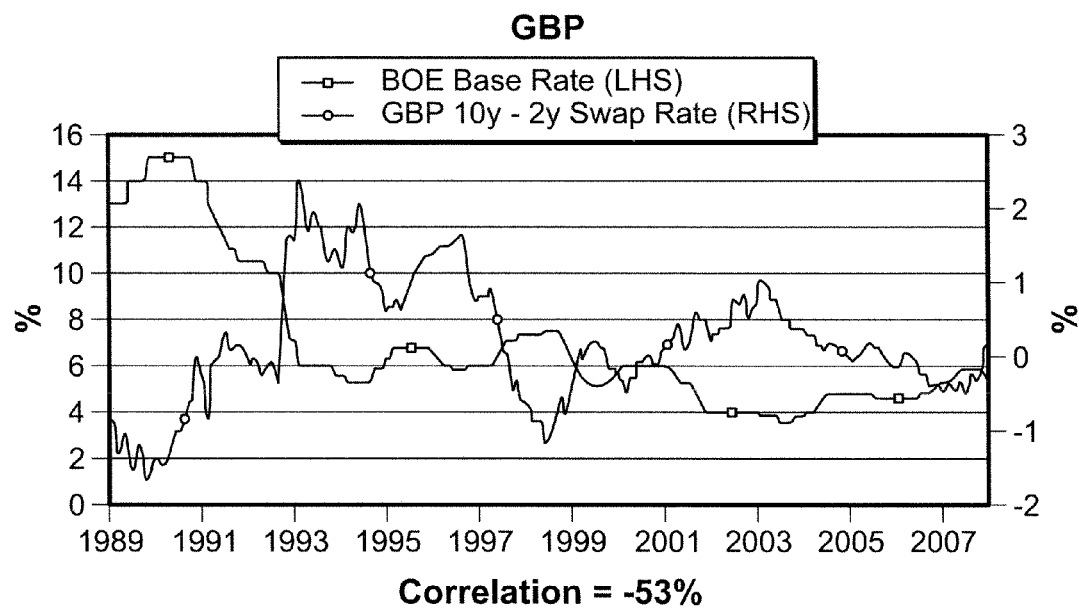
FIG. 8 depicts negative correlation of BOE base rate and GBP swap curve slope.
Figure 9:
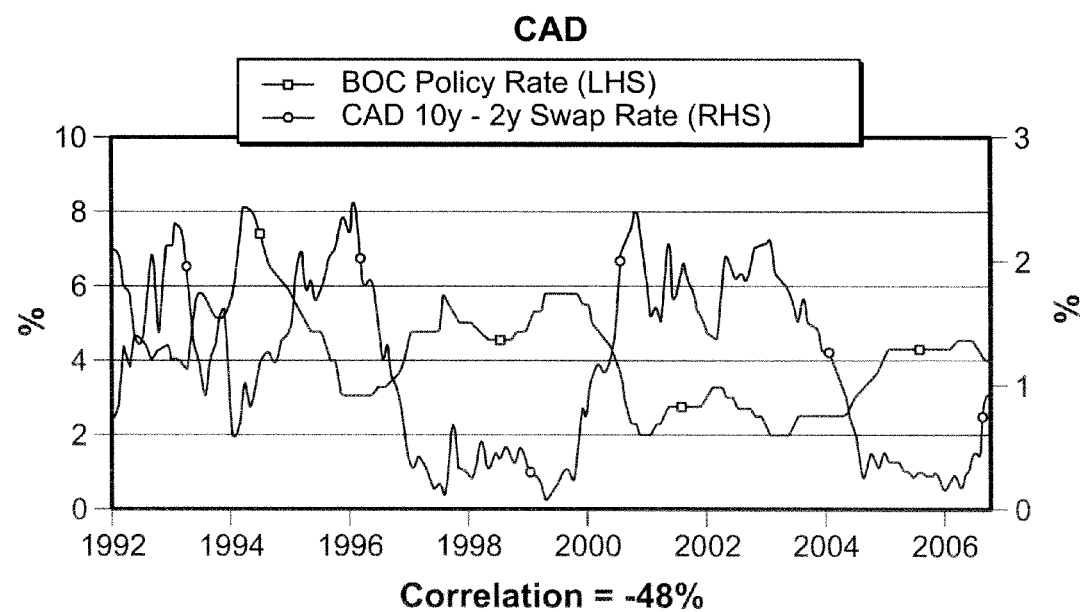
FIG. 9 depicts negative correlation of BOC policy rate and CAD swap curve slope.

Historically, the Fed Funds rate and the swap curve slope have been negatively correlated. See FIG. 5. The same negative correlation can also be observed in other financial regions. See FIGS. 6-9. An embodiment comprises a Global COMPASS Index that uses momentum in monetary policy regimes to determine the appropriate positioning in the slope of the yield curves.

Policy rates and yield curves are fundamentally linked. Central banks effect monetary policy by intervening in markets to set short term lending rates. The current level and expected future levels of short rates are a key influence on the shape of the yield curve.

Momentum in curve slopes can be exploited. Markets tend to chronically underestimate changes in policy regime, as well as cross market relationships (U.S. in particular). This creates momentum in the slope of the curve over the course of tightening and easing cycles.

Solid rationale underlies the market inefficiency. Business cycle dynamics are complex and difficult to predict. Thus markets tend to exhibit confirmation biases (i.e., to wait for further information to corroborate a potential change in the market environment) and herd mentality.

Computing Global COMPASS Signals

The positions in the slope of yield curves implemented are derived from the dynamics of monetary policy regimes. The signal for each currency is calculated as the average of three monetary policy indicators. More details are provided below.

Local Monetary Policy

The current local monetary policy regime (tightening vs. easing cycles) is assessed through the past quarter change in the local central bank target rate.

Possible indicator values: +1, −1.

Fed Monetary Policy

The U.S. economy is the world's predominant economy and the Fed is a relatively proactive central bank. Hence Fed actions can potentially exhibit cross-momentum impact on other swap curves.

The same methodology as that used for the local monetary signal is applied to compute this indicator.

Possible indicator values: +1, −1.

Monetary Surprises

Steepeners tend to outperform in periods when there is a negative/downward surprise in short rates (as compared to what was expected by forwards).

The monetary policy surprise indicator identifies the recent surprises in monetary policy by comparing short rates (3m) priced in by forwards 3-month ago with the actual realized short rates.

Possible indicator vales: +1, −1.

Figure 10:
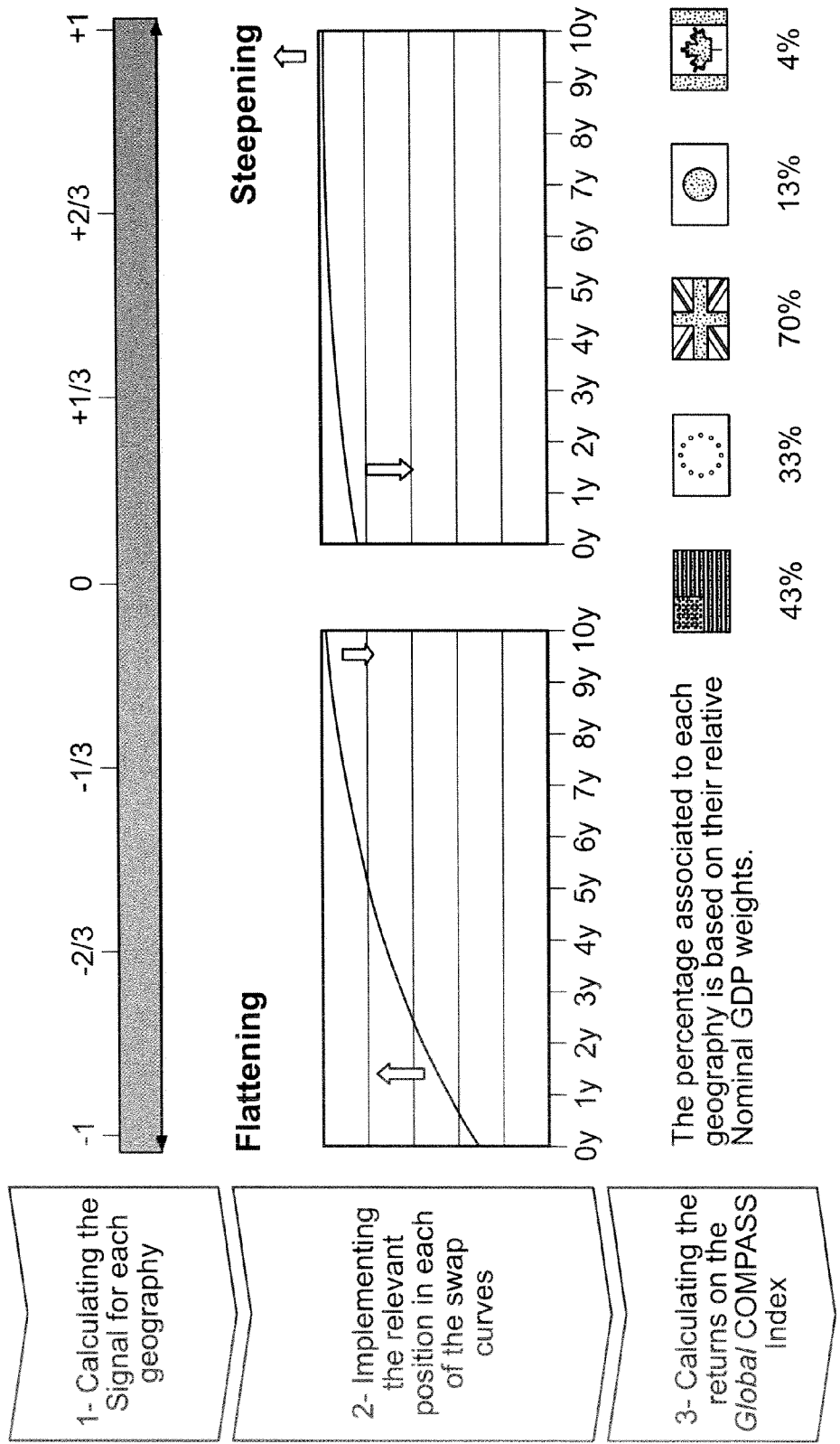
FIG. 10 illustrates signal determination of curve position taken by an exemplary embodiment (Global Compass index) of the invention.

Signals are calculated for each swap curve: USD, EUR, GBP, JPY and CAD. Each Signal determines the curve position taken by the Global COMPASS Index. See FIG. 10.

Historical Global COMPASS Index Performance

Figure 11:
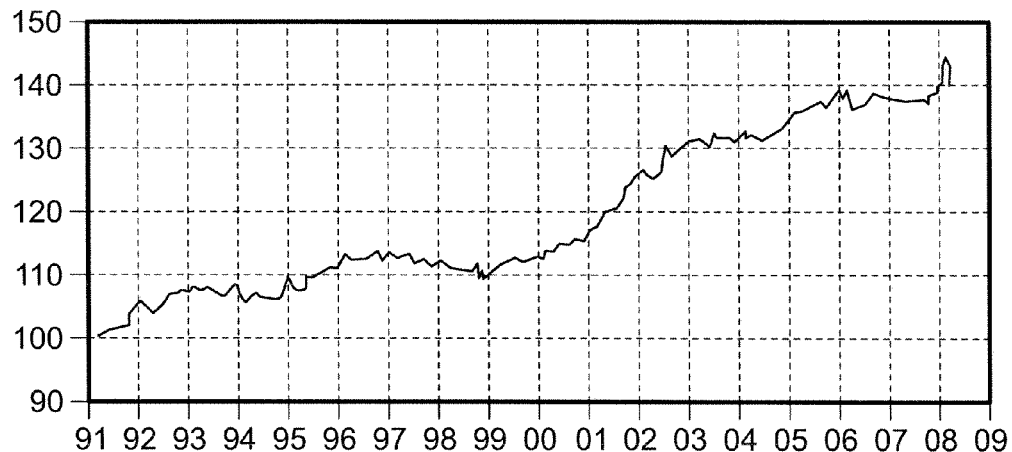
FIG. 11 depicts historical performance of an exemplary Global Compass index.

We compute the historical Global COMPASS Index return based upon the strategy described above. FIG. 11 illustrates the performance on Index net of hedging costs. TABLE 4 shows that historically the Sharpe Ratio of the Strategy would have been attractive. The Index shows the return on the derivative-based strategy only (pure alpha) and does not reflect any accretion at Libor. Bloomberg ticker: LBGLCMEU<Index><Go>.

TABLE 4

Statistical Analysis(*)

|  | Feb-91 | 5 years | 12 months | 6 months | 3 months |
|---|---|---|---|---|---|
| Avg Annual. Return | 2.2% | 1.6% | 2.6% | 4.8% | 6.9% |
| StDev Annual. Return | 2.0% | 1.7% | 2.5% | 3.5% | 4.7% |
| Sharpe Ratio | 1.10 | 0.93 | 1.02 | 1.37 | 1.45 |
| Maximum 1-day fall | −1.0% | −0.7% | −0.7% | −0.7% | −0.7% |
| % of positive returns | 53% | 53% | 54% | 57% | 62% |
| % of negative returns | 47% | 47% | 46% | 43% | 38% |

TABLE 5

Correlation of monthly Returns

| Global Equity Index (**) | −24% |
|---|---|
| Lehman Global Aggregate Index [Bond] | −3% |
| Lehman Global Agg. Corporate Index [Credit] | −5% |
| Lehman Commodity Index | −19% |

*Calculations are based on daily data from February 1991 to 14 March 2008
**GDP-weighted composite Index of the leading Equity indices in each of the 5 geographies covered by the Global COMPASS Index. Correlation numbers for the Products Linked to the Global COMPASS Index Delta 1: A simple and effective way to gain direct exposure to the Global COMPASS Index.

CCPI: CPPI structures offer a dynamic allocation mechanism that further enhances the return while providing capital protection at maturity. Constant proportion portfolio insurance ("CPPI") is a technique for leveraging investments while providing full or partial protection. Credit CPPI notes, for example, are investments whose principal is protected by a low-risk portfolio consisting of zero-coupon bonds or a cash deposit, and whose return is increased by leveraging the exposure to a portfolio of credit default swap names.

Custom Payouts: It is possible to structure options ranging from vanilla call options to more exotic options on the Global COMPASS Index.

EMTN stands for Euro Medium Term Note. EMTN/Certificates are structured notes using, for example, Lehman Brothers as an issuer or a third party are a common and simple format. Different maturities and currencies are available.

OTC Derivatives: OTC Swaps or Options can embed the various payouts available to take exposure to the Global COMPASS Index. Liability structures to lower the cost of funding can be tailored to match needs.

Undertakings for Collective Investment in Transferable Securities (UCITS) are a set of European Union directives that aim to allow collective investment schemes to operate freely throughout the EU on the basis of a single authorisation from one member state. UCITS (for example, UCITS III) provides a transparent and consistent regulatory framework that provides improved liquidity.

Figure 12:
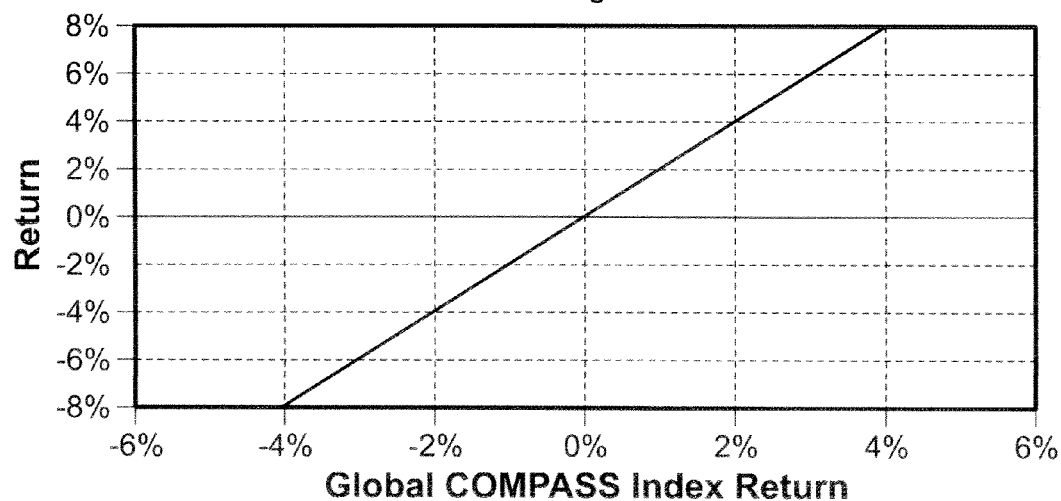
FIG. 12 depicts an exemplary payoff diagram.

Total Return Swap (Delta 1): in a Total Return Swap, at the end of every period, the investor receives or pays the actual performance of the Global COMPASS Index over the period minus fees. A positive performance of the index is received by the investor, while a negative performance is paid. Thus the investor is exposed to all the upside and downside of the index. A total return swap is an effective way to gain direct exposure to the Global COMPASS Index. See FIG. 12.

TABLE 6

Indicative Terms and Conditions

| | |
|---|---|
| Maturity | 5 years |
| Currency | EUR (other currencies available) |
| Party A | Lehman Brothers |
| Party B | Client |
| | Leverage × [(Index$_{End}$/Index$_{Start}$) − 1] × Notional Amount |
| Periodic Payments | If the result of the above is positive, Party A will pay this amount to Party B, while if this amount is negative, its absolute value will be paid by Party B to Party A |
| Index | Global COMPASS Index |
| Frequency | Quarterly |
| Basis | Act/360 |
| Fees | To be determined |

CPPI Notes/Swaps: CPPI Notes offer a structured participation using a dynamic allocation approach. A CPPI Investment combines a floating rate investment (limited duration risk) with a leveraged exposure into the Global COMPASS Index. The Capital is calculated on a daily basis as follows:

Capital growing at the Euribor Rate
+
Leveraged Return Earned on the Strategy
−
Fee Dynamic Allocation Mechanism The Exposure is usually a function of the performance of the strategy during the preceding calculation period:

Typically if the strategy underperforms, the Exposure is decreased providing a lower leverage and vice-versa.

Figure 13:
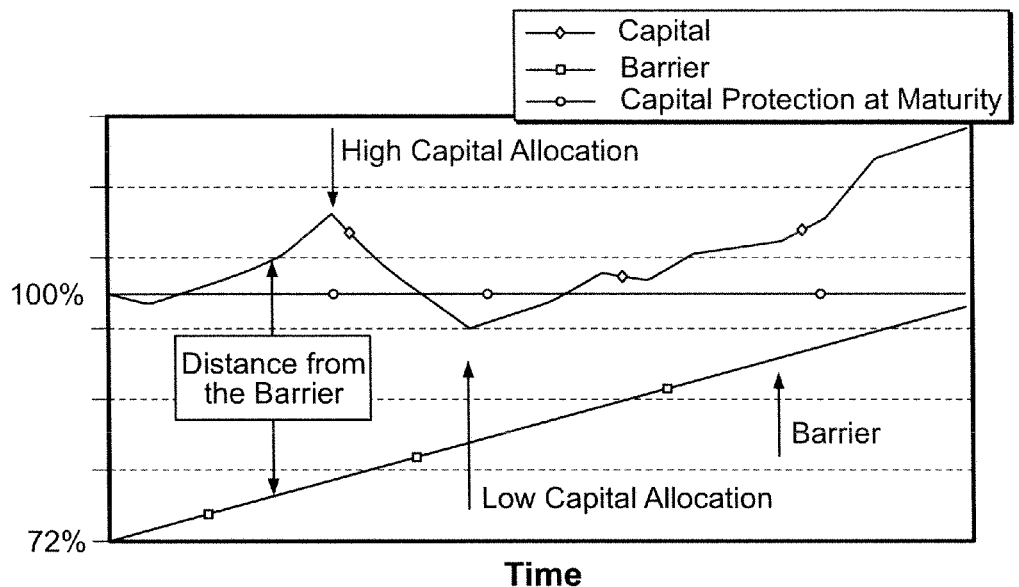
FIG. 13 depicts an exemplary dynamic allocation mechanism.

Under extreme conditions, the strategy might be totally unwound to preserve the capital guarantee at maturity.

$$\text{Exposure} = \text{Multiplier} \times \text{Allocation}$$

where the Allocation is defined as the leveraged difference between the value of the Note and the Barrier with a cap. The Barrier represents at inception the present value of the guaranteed amount at maturity. This Barrier is fixed and rises linearly to 100% over the life of the note. The Barrier has therefore the appealing feature of being insensitive to interest rate movements. See FIG. 13.

CPPI Notes/Swaps—Historical Performance

Figure 14:
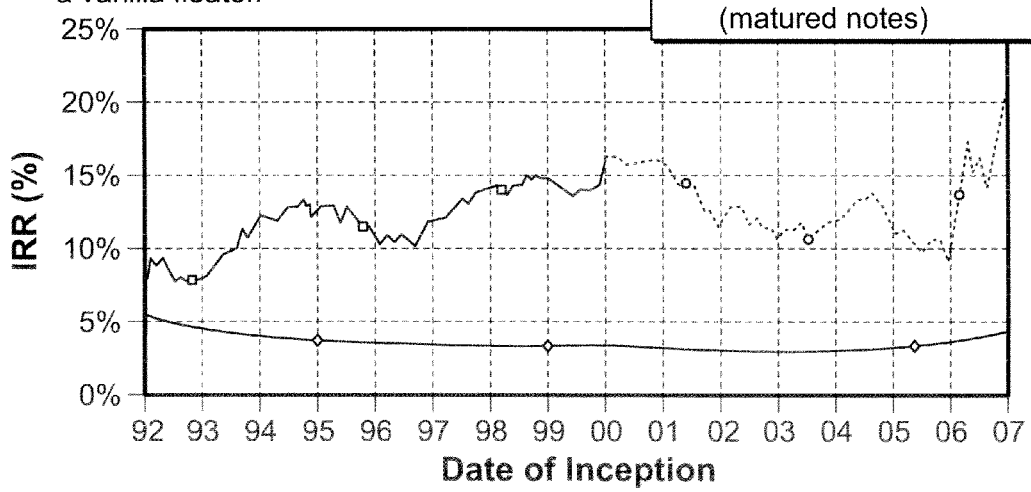
FIG. 14 illustrates a performance comparison of vanilla floater versus Global Compass note.

The Global COMPASS Note would have outperformed a vanilla floater over most periods. The performance is analyzed (net of fees with Euribor flat issuer) for an 8-year investment assuming that on each month of the back-testing period an equal amount is invested in the Global COMPASS note and a vanilla floater. See FIG. 14.

TABLE 7

| | Global COMPASS Matured Notes | Global COMPASS Total Notes | Vanilla Floater |
|---|---|---|---|
| Average Return | 11.67% | 12.31% | 3.57% |
| Min. Return | 7.62% | 7.62% | 2.82% |
| Max Return | 16.16% | 22.47% | 5.18% |

TABLE 8

Indicative Terms and Conditions

| | |
|---|---|
| Maturity | 8 years (Alternative: 5 years or more) |
| Currency | EUR (other currencies available) |
| Issuer | Euribor flat issuer |
| Issue Price | 100% |
| Coupon | None (Alternative: Coupon paying structures available) |
| Redemption | Max [100% , Capital$_{End}$] |
| | For any month t: |
| Capital$_t$ | (i) Capital$_{t-1}$ × (1 + Euribor × Daycount$_t$) + |
| | (ii) Capital$_{t-1}$ × Exposure$_t$ × Performance$_t$ − |
| | (iii) Fees × Daycount$_t$ |
| Exposure$_t$ | [4.0] × Allocation$_t$ |
| Allocation$_t$ | [3.50] × (Capital$_t$ − Barrier$_t$)/Capital$_t$ with a maximum of [100%] |
| Barrier$_t$ | [71.25%] + [28.75%] × (t/T) where: T is the Total number of days from the Initial Allocation Date to but excluding the Final Allocation Date |
| Fees | To be determined |

Liability Structures

Figure 15:
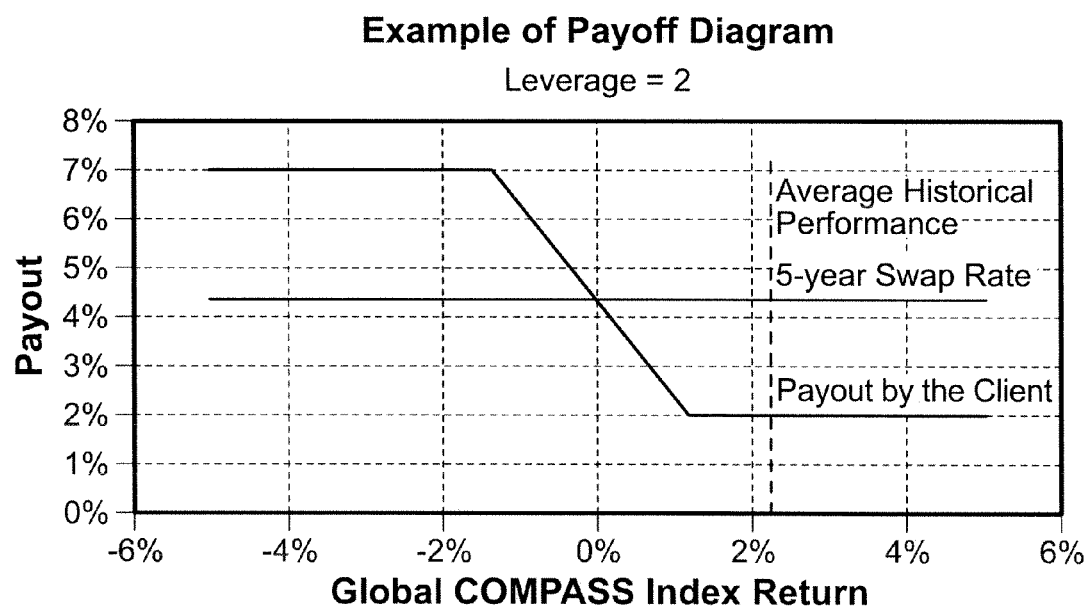
FIG. 15 depicts an exemplary payoff diagram.

In a Liability Structure, at the end of the every period, the borrower receives 3m Euribor+Spread and pays: (Fixed rate−Leverage×Global COMPASS Index performance in the period). The payments are subject to a floor and a cap. This is an effective way to potentially reduce the cost of funding by taking exposure to the Global COMPASS Index. See FIG. 15.

TABLE 9

Indicative Terms and Conditions

| | |
|---|---|
| Maturity | 5 years |
| Currency | EUR (other currencies available) |
| Party A | Lehman Brothers |

TABLE 9-continued

Indicative Terms and Conditions

| Party B | Client |
|---|---|
| Party A Pays | 3 m Euribor + Spread |
| Party B Pays | Fixed Rate − Leverage × Index Performance$_t$, Floored at [TBD] %, capped at [TBD] % |
| Index Performance | (Index$_t$/Index$_{t-1}$ − 1 or (Index$_t$/Index$_0$) − 1 |
| Index | Global COMPASS Index |
| Frequency | Quarterly |
| Basis | Act/360 |

Index Backtesting Exemplary Methodology and Assumptions

Data Source (*)
(*) Backtesting data source might slightly differ from the source used for the Index in production (i.e. data after [x] March 2008)

Swap Curve Construction: Libor and swap rates preferably are obtained from the following sources (in order): 1-ISDA (provided by Bloomberg), 2-LehmanLive, 3-Bloomberg. For each calendar date, select all data points from a single source only if it contains:
  (a) 2-year swap rate and 10-year swap rate
  (b) at least one swap rate point between 1 year and 10 years (excluding 2-year and 10-year points)
  (c) 1-month, 3-month and 6-month deposit rates.
  If one of these conditions is not met, use the next data source.

If none of these conditions is met, the date is assumed to be a non-trading day.

The points (if available) considered to build the curves are:
/deposits/ 1m, 2m, 3m, 6m, 12m
/swaps/ 1y, 2y, 3y, 4y, 5y, 6y, 7y, 8y, 9y, 10y, 12y, 15y, 20y, 30y Libor fixings from LehmanLive may be used for the ISDA data source.

TABLE 10

| | ISDA | Bloomberg-deposits | Bloomberg-swaps |
|---|---|---|---|
| USD | 11 am NY time | BBA fixing | Composite (LDN) |
| EUR | 11 am FFT time | BBA fixing | Composite (LDN) |
| JPY | 10 am TKY time | BBA fixing | Composite (LDN) |
| GBP | 11 am LDN time | BBA fixing | Composite (LDN) |
| CAD | 11 am EST | BBA fixing | Composite (LDN) |

Signals:
Central bank rates data have been provided by Bloomberg:
USD: US Federal Reserve Rate Target (FDTR Index)
EUR: ECB Minimum Bid Refinancing Rate 1 Week (GRRP14LR Index)
GBP: UK Base Rate (UKBRBASE Index)
JPY: Bank of Japan Target Rate (BOJDTR Index)
CAD: Bank of Canada overnight Lending Rate (CABROVER Index)
The Monetary Policy Signal is assumed to be equal to +1 (steepener) when data are missing. There are only two cases:
  For the period of 19 Mar. 2001 to 8 Mar. 2006 where there was no formal recommended target rate in Japan;
  For the period before December 1992 where data for the Bank of Canada overnight Lending Rate were missing.

Index Calculations
The first date of the Index is 25 Feb. 1991 when all 5 series are available.

Foreign Exchange
Data Source: Bloomberg—Composite London (USDDEm has been used for past data).

Forward Calculations
PV01 and forward rates may be determined using historical swap curves.

Transaction costs:
Two types of transaction costs are embedded in the Index:
  Rolling hedge costs are applied on the percentage of the position which is rolled from on Calculation Period to another. This cost is equal to 0.10 bps (spread to mid) on the overall transaction.
  New hedge costs are applied on the net percentage of the position which is necessary to implement/unwind form one Calculation Period to another. This cost (spread to mid) is equal to:
USD: 0.50 bps
EUR: 0.30 bps
GBP: 0.75 bps
JPY: 0.50 bps
CAD: 2 bps Statistical Data:
Sharpe ratio calculations may be done using the following formula:

(Average of Daily Returns×260)/(StDev of Daily Returns×sqrt(260)).

Correlations are done on a monthly basis and use end of month values.

Notes Backtesting Exemplary Methodology and Assumptions
  The internal rate of return (IRR) for a Vanilla Floater is defined as the interest rate at which the net present value of the cash flows received (monthly 1-month Euribor cash flows plus redemption amount) equals the issue price.
  The back-testing of the Global Compass Notes have been carried out on a monthly basis assuming that on each month of the back-testing period an equal amount is invested in the Compass note and a Vanilla Floater. The data and graph on this presentation are based on the IRR of these returns for each month.
  For backtested notes we evaluated whether a suspension event occurred on each of the roll dates. The analysis found that no suspension event occurred on any of the roll dates of historically backtested notes.
  The value of the Barrier for historically issued notes is determined by using the yield curve as of the note issue date (source: Bloomberg).

Exemplary Terms and Conditions
As explained above, Global COMPASS Index embodiments aim to capture the changes in the slope of swap curves. The underlying strategies are steepeners or flatteners on the slope of the five swap curves of the largest financial geographies: United States (US), Euro-area (EU), Japan (UK), United Kingdom (UK) and Canada (CA).

Following the calculation of weekly signals based on the dynamics of the different monetary policy regimes, steepeners or flatteners positions are implemented in the respective curves. Sub-indices for the 5 geographies are created.

The returns of each of these sub-indices, with weights based on relative GDP figures, determine the returns of the Global COMPASS Index.

Roll Dates
Monday of each week subject to the Following Index Business Day Convention.

Calculation Period

From and excluding one Roll Date to but including the immediately following Roll Date.

Calculation of the Index commences on [●], which is also the start of the Initial Calculation Period.

Index Business Days

London, New York and Target.

$Index_{Global,t}$

The Index Level on [●] shall be equal to 100. ($Index_{GLOBAL, INITIAL}$).

For any Index Business Day t, $$Index_{Global,t} = \begin{cases} 42.50\% \times \left(\frac{Index_{US,t}}{Index_{US,t-1}} - 1\right) + 33.00\% \times \left(\frac{Index_{EU,t}}{Index_{EU,t-1}} - 1\right) + \\ 13.50\% \times \left(\frac{Index_{JN,t}}{Index_{JN,t-1}} - 1\right) + 7.00\% \times \left(\frac{Index_{UK,t}}{Index_{UK,t-1}} - 1\right) + \\ 4.00\% \times \left(\frac{Index_{CA,t}}{Index_{CA,t-1}} - 1\right) \end{cases}$$

US Sub-Index $Index_{US,t}$

The Index value on [●] shall be equal to 100. ($Index_{US, [START]} = 100$).

For any Calculation Period $Index_{US, Previous}$ shall be equal to the value of the $Index_{US, Final}$ for the immediately preceding Calculation Period.

For any Index Business Day t during a Calculation Period, $Index_{US, t}$ shall be:

$$Index_{US,Previous} \times \begin{cases} 1 + Signal_{US} \times \begin{bmatrix} \frac{(10yFwd^t_{US,1m-t} - 10yFwd^0_{US,1m}) \times 10yPV01^t_{US,1m-t}}{-(2yFwd^t_{US,1m-t} - 2yFwd^0_{US,1m}) \times} \\ 2yPV01^t_{US,1m-t} \times \frac{10yPV01^0_{US,1m}}{2yPV01^0_{US,1m}} \end{bmatrix} - \\ TC_{US} \end{cases}$$

For any Calculation Period, $Index_{US, Final}$ shall be equal to $Index_{US, t}$ where t is the Final Fixing Date for such Calculation Period.

For the purpose of evaluating whether a Suspension Event should occur the $Index_{US}$ may be valued intra-day by the Calculation Agent using current market data at that time to calculate the swap rates, but following the same formula and methodology as above.

$TC_{US}$

The Transaction Costs will be charged based on the cost of rolling the position from one Calculation Period to another and the cost of implementation/unwinding new positions from one Calculation Period to another.

i) If the sign of $Signal_{US}^{Previous}$ is different from the sign of $Signal_{US}$:

$$TC_{US} = |Signal_{US} - Signal_{US}^{Previous}| \times 0.0050\% \times 10yPV01^0_{US,1m}$$

ii) Otherwise, $$TC_{US} = \begin{cases} \min(|Signal_{US}|; |Signal_{US}^{Previous}|) \times 0.0010\% + \\ |Signal_{US} - Signal_{US}^{Previous}| \times 0.0050\% \end{cases} \times 10yPV01^0_{US,1m}$$

Where $Signal_{US}^{Previous}$ is equal to $Signal_{US}$ for the previous Calculation Period (or zero in the case of the Initial Calculation Period).

$Signal_{US}$

For any Calculation Period, the value of the US Global COMPASS signal calculated on or about [0.8.00 am London time] by the Calculation Agent one US Business Day before the Initial Fixing Date.

Initial Fixing Date

For any Calculation Period, the Final Fixing Date of the preceding Calculation Period subject to adjustment with the Following US Business Day Convention.

Final Fixing Date

For any Calculation Period, the last Index Business Day of such Calculation Period.

Forward Start $Date_{US}$

For any Calculation Period, the day that is one month following the Initial Fixing Date for such Calculation Period subject to adjustment with the Following US Business Day Convention.

$10yFwd_{US,1m}^0$

For any Calculation Period, the forward rate for a semi-annual USD swap transaction with a maturity of 10 years on a 30/360 basis and with an effective date on the Forward Start Date, to be calculated by the Calculation Agent with reference to market data observed as of 11:00 am New York Time on the Initial Fixing Date.

$10yFwd_{US,1m-t}^t$

For any Index Business Day t during a Calculation Period (to and including the Final Fixing Date), the forward rate for a semi-annual USD swap transaction with a maturity of 10 years on a 30/360 basis and with an effective date on the Forward Start Date, to be calculated by the Calculation Agent with reference to market data observed as of 11:00 am New York Time on such day.

For any Index Business Day t which is not a US Business Day, $10yFwd_{US,1m-t}^t$ will be equal to $10yFwd_{US,1m-(t-1)}^{(t-1)}$.

$2yFwd_{US,1m}^0$

For any Calculation Period, the forward rate for a semi-annual USD swap transaction with a maturity of 2 years on a 30/360 basis and with an effective date on the Forward Start Date, to be calculated by the Calculation Agent with reference to market data observed as of 11:00 am New York Time on the Initial Fixing Date.

$2yFwd_{US,1m-t}^t$

For any Index Business Day t during a Calculation Period (to and including the Final Fixing Date), the forward rate for a semi-annual USD swap transaction with a maturity of 2 years on a 30/360 basis and with an effective date on the Forward Start Date, to be calculated by the Calculation Agent with reference to market data observed as of 11:00 am New York Time on such day.

For any Index Business Day t which is not a US Business Day, $2yFwd_{US,1m-t}^t$ will be equal to $2yFwd_{US,1m-(t-1)}^{(t-1)}$.

$10yPV01_{US,1m}^0$

For any Calculation Period, the present value in USD of USD 1 per annum paid semi-annually, 30/360, unadjusted, following, from and including the Forward Start Date for such Calculation Period to but excluding the maturity date of such $10yFwd_{US,1m}^0$ as determined by the Calculation Agent with reference to market data observed as of 11:00 am New York Time on the Initial Fixing Date.

$10yPV01_{US,1m\text{-}t}{}^{t}$

For any Index Business Day t during a Calculation Period, the present value in USD of USD 1 per annum paid semi-annually, 30/360, unadjusted, following from and including the Forward Start Date for such Calculation Period to but excluding the maturity date of such $10yFwd_{US,1m}{}^{0}$ as determined by the Calculation Agent with reference to market data observed as of 11:00 am New York Time on that day.

For any Index Business Day t which is not a US Business Day, $10yPV01_{US,1m\text{-}t}{}^{t}$ will be equal to $10yPV01_{US,1m\text{-}(t-1)}{}^{(t-1)}$.

$2yPV01_{US,1m}{}^{0}$

For any Calculation Period, the present value in USD of USD 1 per annum paid semi-annually, 30/360, unadjusted, following, from and including the Forward Start Date for such Calculation Period to but excluding the maturity date of such $2yFwd_{US,1m}{}^{0}$ as determined by the Calculation Agent with reference to market data observed as of 11:00 am New York Time on the Initial Fixing Date.

$2yPV01_{US,1m\text{-}t}{}^{t}$

For any Index Business Day t during a Calculation Period, the present value in USD of USD 1 per annum paid semi-annually, 30/360, unadjusted, following from and including the Forward Start Date for such Calculation Period to but excluding the maturity date of such $2yFwd_{US,1m}{}^{0}$ as determined by the Calculation Agent with reference to market data observed as of 11:00 am New York Time on that day.

For any Index Business Day t which is not a US Business Day, $2yPV01_{US,1m\text{-}t}{}^{t}$ will be equal to $2yPV01_{US,1m\text{-}(t-1)}{}^{(t-1)}$.

US Business Days
New York.
EU Sub-Index
$Index_{EU,t}$

The Index value on [●] shall be equal to 100. ($Index_{EU, [START]}$=100.

For any Calculation Period $Index_{EU, Previous}$ shall be equal to the value of the $Index_{EU, Final}$ for the immediately preceding Calculation Period.

For any Index Business Day t during a Calculation Period, $Index_{EU, t}$ shall be:

$$Index_{EU, Previous} \times \left\{ 1 + \frac{FX_{EU,START}}{FX_{EU,t}} \times \right.$$

$$\left. \left\{ Signal_{EU} \times \begin{bmatrix} 10yFwd_{EU,1m\text{-}t}^{t} - 10yFwd_{EU,1m}^{0}) \times 10yPV01_{EU,1m\text{-}t}^{t} \\ -(2yFwd_{EU,1m\text{-}t}^{t} - 2yFwd_{EU,1m}^{0}) \times \\ 2yPV01_{EU,1m\text{-}t}^{t} \times \frac{10yPV01_{EU,1m}^{0}}{2yPV01_{EU,1m}^{0}} \end{bmatrix} - TC_{EU} \right\} \right\}$$

For any Calculation Period, $Index_{EU, Final}$ shall be equal to $Index_{EU, t}$ where t is the Final Fixing Date for such Calculation Period.

For the purpose of evaluating whether a Suspension Event should occur the $Index_{EU}$ may be valued intra-day by the Calculation Agent using current market data at the time to calculate the swap rates, but following the same formula and methodology as above.

$TC_{EU}$

The Transaction Costs will be charged based on the cost of rolling the position from one Calculation Period to another and the cost of implementing/unwinding new positions from one Calculation Period to another.

i) If the sign of $Signal_{EU}{}^{Previous}$ is different from the sign of $Signal_{EU}$:

$$TC_{EU} = |Signal_{EU} - Signal_{EU}{}^{Previous}| \times 0.0050\% \times 10yPV01_{EU,1m}^{0}$$

ii) Otherwise, $$TC_{EU} = \left\{ \begin{array}{l} \min(|Signal_{EU}|; |Signal_{EU}^{Previous}|) \times 0.0010\% + \\ |Signal_{EU} - Signal_{EU}^{Previous}| \times 0.0050\% \end{array} \right\} \times 10yPV01_{EU,1m}^{0}$$

Where $Signal_{EU}{}^{Previous}$ is equal to $Signal_{EU}$ for the previous Calculation Period (or zero in the case of the Initial Calculation Period).

$FX_{EU, Start}$

For any Calculation Period, the exchange rate (quoted as the number of EUR per 1 unit of USD) as determined by the Calculation Agent with reference to market data observed as of [8:00 am London Time] one EU Business Day before the Initial Fixing Date.

$FX_{EU, t}$

For any Index Business Day t, the exchange rate (quoted as the number of EUR per 1 unit of USD) as determined by the Calculation Agent with reference to market data observed as of [8:00 am London Time] on such day t.

$Signal_{EU}$

For any Calculation Period, the value of the EU Global COMPASS signal calculated on or about [08:00 am London time] by the Calculation Agent one US Business Day before the Initial Fixing Date.

Initial Fixing Date

For any Calculation Period, the Final Fixing Date of the preceding Calculation Period subject to adjustment with the Following EU Business Day Convention.

Final Fixing Date

For any Calculation Period, the last Index Business Day of such Calculation Period.

Forward Start Date$_{EU}$

For any Calculation Period, the day that is one month following the Initial Fixing Date for such Calculation Period subject to adjustment with the Following EU Business Day Convention.

$10yFwd_{EU,1m}{}^{0}$

For any Calculation Period, the forward rate for a semi-annual EUR swap transaction with a maturity of 10 years on a 30/360 basis and with an effective date on the Forward Start Date, to be calculated by the Calculation Agent with reference to market data observed as of 11:00 am London Time on the Initial Fixing Date.

$10yFwd_{EU,1m\text{-}t}{}^{t}$

For any Index Business Day t during a Calculation Period (to and including the Final Fixing Date), the forward rate for a semi-annual EUR swap transaction with a maturity of 10 years on a 30/360 basis and with an effective date on the Forward Start Date, to be calculated by the Calculation Agent with reference to market data observed as of 11:00 am London Time on such day.

For any Index Business Day t which is not a EU Business Day, $10\text{yFwd}_{EU,1m\text{-}t}^{t}$ will be equal to $10\text{yFwd}_{EU,1m\text{-}(t\text{-}1)}^{(t\text{-}1)}$.

$2\text{yFwd}_{EU,1m}^{0}$

For any Calculation Period, the forward rate for a semi-annual EUR swap transaction with a maturity of 2 years on a 30/360 basis and with an effective date on the Forward Start Date, to be calculated by the Calculation Agent with reference to market data observed as of 11:00 am London Time on the Initial Fixing Date.

$2\text{yFwd}_{EU,1m\text{-}t}^{t}$

For any Index Business Day t during a Calculation Period (to and including the Final Fixing Date), the forward rate for a semi-annual USD swap transaction with a maturity of 2 years on a 30/360 basis and with an effective date on the Forward Start Date, to be calculated by the Calculation Agent with reference to market data observed as of 11:00 am London Time on such day.

For any Index Business Day t which is not a EU Business Day, $2\text{yFwd}_{EU,1m\text{-}t}^{t}$ will be equal to $2\text{yFwd}_{EU,1m\text{-}(t\text{-}1)}^{(t\text{-}1)}$.

$10\text{yPV01}_{EU,1m}^{0}$

For any Calculation Period, the present value in EUR of EUR 1 per annum paid semi-annually, 30/360, unadjusted, following, from and including the Forward Start Date for such Calculation Period to but excluding the maturity date of such $10\text{yFwd}_{EU,1m}^{0}$ as determined by the Calculation Agent with reference to market data observed as of 11:00 am London Time on the Initial Fixing Date.

$10\text{yPV01}_{EU,1m\text{-}t}^{t}$

For any Index Business Day t during a Calculation Period, the present value in EUR of EUR 1 per annum paid semi-annually, 30/360, unadjusted, following from and including the Forward Start Date for such Calculation Period to but excluding the maturity date of such $10\text{yFwd}_{EU,1m}^{0}$ as determined by the Calculation Agent with reference to market data observed as of 11:00 am London Time on that day.

For any Index Business Day t which is not a EU Business Day, $10\text{yPV01}_{EU,1m\text{-}t}^{t}$ will be equal to $10\text{yPV01}_{EU,1m\text{-}(t\text{-}1)}^{(t\text{-}1)}$.

$2\text{yPV01}_{EU,1m}^{0}$

For any Calculation Period, the present value in EUR of EUR 1 per annum paid semi-annually, 30/360, unadjusted, following, from and including the Forward Start Date for such Calculation Period to but excluding the maturity date of such $2\text{yFwd}_{EU,1m}^{0}$ as determined by the Calculation Agent with reference to market data observed as of 11:00 am London Time on the Initial Fixing Date.

$2\text{yPV01}_{EU,1m\text{-}t}^{t}$

For any Index Business Day t during a Calculation Period, the present value in EUR of EUR 1 per annum paid semi-annually, 30/360, unadjusted, following from and including the Forward Start Date for such Calculation Period to but excluding the maturity date of such $2\text{yFwd}_{EU,1m}^{0}$ as determined by the Calculation Agent with reference to market data observed as of 11:00 am London Time on that day.

For any Index Business Day t which is not a EU Business Day, $2\text{yPV01}_{EU,1m\text{-}t}^{t}$ will be equal to $2\text{yPV01}_{EU,1m\text{-}(t\text{-}1)}^{(t\text{-}1)}$.

EU Business Days

Target.

UK Sub-Index $\text{Index}_{UK,t}$

The Index value on [●] shall be equal to 100. ($\text{Index}_{UK,\,[START]}=100$.

For any Calculation Period $\text{Index}_{UK,\,Previous}$ shall be equal to the value of the $\text{Index}_{UK,\,Final}$ for the immediately preceding Calculation Period.

For any Index Business Day t during a Calculation Period, $\text{Index}_{UK,\,t}$ shall be:

$$\text{Index}_{UK,Previous} \times \left\{ 1 + \frac{FX_{UK,START}}{FX_{UK,t}} \times \right.$$

$$\left. \left( |\text{Signal}_{UK}| \times \left[ \begin{array}{c} (10\text{yFwd}_{UK,1m\text{-}t}^{t} - 10\text{yFwd}_{UK,1m}^{0}) \times 10\text{yPV01}_{UK,1m\text{-}t}^{t} \\ -(2\text{yFwd}_{UK,1m\text{-}t}^{t} - 2\text{yFwd}_{UK,1m}^{0}) \times \\ 2\text{yPV01}_{UK,1m\text{-}t}^{t} \times \frac{10\text{yPV01}_{UK,1m}^{0}}{2\text{yPV01}_{UK,1m}^{0}} \end{array} \right] - TC_{UK} \right) \right\}$$

For any Calculation Period, $\text{Index}_{UK,\,Final}$ shall be equal to $\text{Index}_{UK,\,t}$, where t is the Final Fixing Date for such Calculation Period.

For the purpose of evaluating whether a Suspension Event should occur the $\text{Index}_{UK}$ may be valued intra-day by the Calculation Agent using current market data at the time to calculate the swap rates, but following the same formula and methodology as above.

$TC_{UK}$

The Transaction Costs will be charged based on the cost of rolling the position from one Calculation Period to another and the cost of implementing/unwinding new positions from one Calculation Period to another.

i) If the sign of $\text{Signal}_{UK}^{Previous}$ is different from the sign of $\text{Signal}_{UK}$:

$TC_{UK} = |\text{Signal}_{UK} - \text{Signal}_{UK}^{Previous}| \times 0.0050\% \times 10\text{yPV01}_{UK,1m}^{0}$ ii) Otherwise, $$TC_{UK} = \left\{ \begin{array}{c} \min(|\text{Signal}_{UK}|;\,|\text{Signal}_{UK}^{Previous}|) \times 0.0010\% + \\ |\text{Signal}_{UK} - \text{Signal}_{UK}^{Previous}| \times 0.0050\% \end{array} \right\} \times 10\text{yPV01}_{UK,1m}^{0}$$

Where $\text{Signal}_{UK}^{Previous}$ is equal to $\text{Signal}_{UK}$ for the previous Calculation Period (or zero in the case of the Initial Calculation Period).

$FX_{UK,Start}$

For any Calculation Period, the exchange rate (quoted as the number of GBP per 1 unit of USD) as determined by the Calculation Agent with reference to market data observed as of 11:00 am London Time one UK Business Day before the Initial Fixing Date.

$FX_{UK,t}$

For any Index Business Day t, the exchange rate (quoted as the number of GBP per 1 unit of USD) as determined by the Calculation Agent with reference to market data observed as of 11:00 am London Time on such day t.

$\text{Signal}_{UK}$

For any Calculation Period, the value of the UK Global COMPASS signal calculated on or about [08:00 am London time] by the Calculation Agent one US Business Day before the Initial Fixing Date.

Initial Fixing Date

For any Calculation Period, the Final Fixing Date of the preceding Calculation Period subject to adjustment with the Following UK Business Day Convention.

Final Fixing Date

For any Calculation Period, the last Index Business Day of such Calculation Period.

Forward Start Date$_{UK}$

For any Calculation Period, the day that is one month following the Initial Fixing Date for such Calculation Period subject to adjustment with the Following UK Business Day Convention.

10yFwd$_{UK,1m}^{0}$

For any Calculation Period, the forward rate for a semi-annual GBP swap transaction with a maturity of 10 years on a Act/365 basis and with an effective date on the Forward Start Date, to be calculated by the Calculation Agent with reference to market data observed as of 11:00 am London Time] on the Initial Fixing Date.

10yFwd$_{UK,1m-t}^{0}$

For any Index Business Day t during a Calculation Period (to and including the Final Fixing Date), the forward rate for a semi-annual GBP swap transaction with a maturity of 10 years on a Act/365 basis and with an effective date on the Forward Start Date, to be calculated by the Calculation Agent with reference to market data observed as of 11:00 am London Time on such day.

For any Index Business Day t which is not a UK Business Day, 10yFwd$_{UK,1m-t}^{t}$ will be equal to 10yFwd$_{UK,1m-(t-1)}^{(t-1)}$.

2yFwd$_{UK,1m}^{0}$

For any Calculation Period, the forward rate for a semi-annual GBP swap transaction with a maturity of 2 years on a Act/365 basis and with an effective date on the Forward Start Date, to be calculated by the Calculation Agent with reference to market data observed as of 11:00 am London Time on the Initial Fixing Date.

2yFwd$_{UK,1m-t}^{t}$

For any Index Business Day t during a Calculation Period (to and including the Final Fixing Date), the forward rate for a semi-annual GBP swap transaction with a maturity of 2 years on a Act/365 basis and with an effective date on the Forward Start Date, to be calculated by the Calculation Agent with reference to market data observed as of 11:00 am London Time on such day.

For any Index Business Day t which is not a UK Business Day, 2yFwd$_{UK,1m-t}^{t}$ will be equal to 2yFwd$_{UK,1m-(t-1)}^{(t-1)}$.

10yPV01$_{UK,1m}^{0}$For any Calculation Period, the present value in GBP of GBP 1 per annum paid semi-annually, Act/365, unadjusted, following, from and including the Forward Start Date for such Calculation Period to but excluding the maturity date of such 10yFwd$_{UK,1m}^{0}$ as determined by the Calculation Agent with reference to market data observed as of 11:00 am London Time on the Initial Fixing Date.

10yPV01$_{UK,1m-t}^{0}$

For any Index Business Day t during a Calculation Period, the present value in GBP of GBP 1 per annum paid semi-annually, Act/365, unadjusted, following from and including the Forward Start Date for such Calculation Period to but excluding the maturity date of such 10yFwd$_{UK,1m}^{0}$ as determined by the Calculation Agent with reference to market data observed as of 11:00 am London Time on that day.

For any Index Business Day t which is not a UK Business Day, 10yPV01$_{UK,1m-t}^{t}$ will be equal to 10yPV01$_{UK,1m-(t-1)}^{(t-1)}$.

2yPV01$_{UK,1m}^{0}$

For any Calculation Period, the present value in GBP of GBP 1 per annum paid semi-annually, Act/365, unadjusted, following, from and including the Forward Start Date for such Calculation Period to but excluding the maturity date of such 2yFwd$_{UK,1m}^{0}$ as determined by the Calculation Agent with reference to market data observed as of 11:00 am London Time on the Initial Fixing Date.

2yPV01$_{UK,1m-t}^{t}$

For any Index Business Day t during a Calculation Period, the present value in GBP of GBP 1 per annum paid semi-annually, Act/365, unadjusted, following from and including the Forward Start Date for such Calculation Period to but excluding the maturity date of such 2yFwd$_{UK,1m}^{0}$ as determined by the Calculation Agent with reference to market data observed as of 11:00 am London Time on that day.

For any Index Business Day t which is not a UK Business Day, 2yPV01$_{UK,1m-t}^{t}$ will be equal to 2yPV01$_{UK,1m-(t-1)}^{(t-1)}$.

UK Business Days

London.

JN Sub-Index

Index$_{JN,t}$

The Index value on [●] shall be equal to 100. (Index$_{JN,[START]}$=100.

For any Calculation Period Index$_{JN, Previous}$ shall be equal to the value of the Index$_{JN, Final}$ for the immediately preceding Calculation Period.

For any Index Business Day t during a Calculation Period, Index$_{JN, t}$ shall be:

$$\text{Index}_{JN,Previous} \times \left\{ 1 + \frac{FX_{JN,START}}{FX_{t,START}} \times \left( \text{Signal}_{JN} \times \begin{bmatrix} (10yFwd_{JN,1m-t}^{t} - 10yFwd_{JN,1m}^{0}) \times 10yPV01_{JN,1m-t}^{t} \\ -(2yFwd_{JN,1m-t}^{t} - 2yFwd_{JN,1m}^{0}) \times \\ 2yPV01_{JN,1m-t}^{t} \times \frac{10yPV01_{JN,1m}^{0}}{2yPV01_{JN,1m}^{0}} \end{bmatrix} - TC_{JN} \right) \right\}$$

For any Calculation Period, Index$_{JN, Final}$ shall be equal to Index$_{JN, t}$ where t is the Final Fixing Date for such Calculation Period.

For the purpose of evaluating whether a Suspension Event should occur the Index$_{JN}$ may be valued intra-day by the Calculation Agent using current market data at the time to calculate the swap rates, but following the same formula and methodology as above.

TC$_{JN}$

The Transaction Costs will be charged based on the cost of rolling the position from one Calculation Period to another and the cost of implementing/unwinding new positions from one Calculation Period to another.

i) If the sign of Signal$_{JN}^{Previous}$ is different from the sign of Signal$_{US}$:

$TC_{JN} = |\text{Signal}_{JN} - \text{Signal}_{JN}^{Previous}| \times 0.0050\% \times 10yPV01_{JP,1m}^{0}$ ii) Otherwise, $TC_{JP} = \left\{ \begin{array}{l} \min(|\text{Signal}_{JN}|; |\text{Signal}_{JN}^{Previous}|) \times 0.0010\% + \\ |\text{Signal}_{JN} - \text{Signal}_{JN}^{Previous}| \times 0.0050\% \end{array} \right\} \times 10yPV01_{JN,1m}^{0}$ Where $\text{Signal}_{JN}^{Previous}$ is equal to $\text{Signal}_{JN}$ for the previous Calculation Period (or zero in the case of the Initial Calculation Period).

$\text{Signal}_{JN}$

For any Calculation Period, the value of the JN Global COMPASS signal calculated on or about [08:00 am London time] by the Calculation Agent one JN Business Day before the Initial Fixing Date.

Initial Fixing Date

For any Calculation Period, the Final Fixing Date of the preceding Calculation Period subject to adjustment with the Following JN Business Day Convention.

Final Fixing Date

For any Calculation Period, the last Index Business Day of such Calculation Period.

Forward Start Date$_{JN}$

For any Calculation Period, the day that is one month following the Initial Fixing Date for such Calculation Period subject to adjustment with the Following JN Business Day Convention.

$10y\text{Fwd}_{JN,1m}^{0}$

For any Calculation Period, the forward rate for a semi-annual JPY swap transaction with a maturity of 10 years on a 30/360 basis and with an effective date on the Forward Start Date, to be calculated by the Calculation Agent with reference to market data observed as of 11:00 am New York Time on the Initial Fixing Date.

$10y\text{Fwd}_{JN,1m-t}^{t}$

For any Index Business Day t during a Calculation Period (to and including the Final Fixing Date), the forward rate for a semi-annual JPY swap transaction with a maturity of 10 years on a 30/360 basis and with an effective date on the Forward Start Date, to be calculated by the Calculation Agent with reference to market data observed as of 11:00 am New York Time on such day.

For any Index Business Day t which is not a JN Business Day, $10y\text{Fwd}_{JN,1m-t}^{t}$ will be equal to $10y\text{Fwd}_{JN,1m-(t-1)}^{(t-1)}$.

$2y\text{Fwd}_{JN,1m}^{0}$

For any Calculation Period, the forward rate for a semi-annual JPY swap transaction with a maturity of 2 years on a 30/360 basis and with an effective date on the Forward Start Date, to be calculated by the Calculation Agent with reference to market data observed as of 11:00 am New York Time on the Initial Fixing Date.

$2y\text{Fwd}_{JN,1m-t}^{t}$

For any Index Business Day t during a Calculation Period (to and including the Final Fixing Date), the forward rate for a semi-annual JPY swap transaction with a maturity of 2 years on a 30/360 basis and with an effective date on the Forward Start Date, to be calculated by the Calculation Agent with reference to market data observed as of 11:00 am New York Time on such day.

For any Index Business Day t which is not a JN Business Day, $2y\text{Fwd}_{JN,1m-t}^{t}$ will be equal to $2y\text{Fwd}_{JN,1m-(t-1)}^{(t-1)}$.

$10y\text{PV01}_{JN,1m}^{0}$

For any Calculation Period, the present value in JPY of JPY 1 per annum paid semi-annually, 30/360, unadjusted, following, from and including the Forward Start Date for such Calculation Period to but excluding the maturity date of such $10y\text{Fwd}_{JN,1m}^{0}$ as determined by the Calculation Agent with reference to market data observed as of 11:00 am New York Time on the Initial Fixing Date.

$10y\text{PV01}_{JN,1m-t}^{t}$

For any Index Business Day t during a Calculation Period, the present value in JPY of JPY 1 per annum paid semi-annually, 30/360, unadjusted, following from and including the Forward Start Date for such Calculation Period to but excluding the maturity date of such $10y\text{Fwd}_{JN,1m}^{0}$ as determined by the Calculation Agent with reference to market data observed as of 11:00 am New York Time on that day.

For any Index Business Day t which is not a JN Business Day, $10y\text{PV01}_{JN,1m-t}^{t}$ will be equal to $10y\text{PV01}_{JN,1m-(t-1)}^{(t-1)}$.

$2y\text{PV01}_{JN,1m}^{0}$

For any Calculation Period, the present value in JPY of JPY 1 per annum paid semi-annually, 30/360, unadjusted, following, from and including the Forward Start Date for such Calculation Period to but excluding the maturity date of such $2y\text{Fwd}_{JN,1m}^{0}$ as determined by the Calculation Agent with reference to market data observed as of 11:00 am New York Time on the Initial Fixing Date.

$2y\text{PV01}_{JN,1m-t}^{t}$

For any Index Business Day t during a Calculation Period, the present value in JPY of JPY 1 per annum paid semi-annually, 30/360, unadjusted, following from and including the Forward Start Date for such Calculation Period to but excluding the maturity date of such $2y\text{Fwd}_{JN,1m}^{0}$ as determined by the Calculation Agent with reference to market data observed as of 11:00 am New York Time on that day.

For any Index Business Day t which is not a JN Business Day, $2y\text{PV01}_{JN,1m-t}^{t}$ will be equal to $2y\text{PV01}_{JN,1m-(t-1)}^{(t-1)}$.

JN Business Days

Tokyo.

CA Sub-Index $\text{Index}_{CA,t}$

The Index value on [●] shall be equal to 100. ($\text{Index}_{CA, [START]} = 100$.

For any Calculation Period $\text{Index}_{CA, Previous}$ shall be equal to the value of the $\text{Index}_{CA, Final}$ for the immediately preceding Calculation Period.

For any Index Business Day t during a Calculation Period, $\text{Index}_{CA, t}$ shall be:

$$\text{Index}_{CA,Previous} \times \left\{ 1 + \frac{FX_{CA,START}}{FX_{CA,t}} \times \left( \left| \text{Signal}_{CA} \times \begin{bmatrix} (10yFwd_{CA,1m-t}^{t} - 10yFwd_{CA,1m}^{0}) \times 10yPV01_{CA,1m-t}^{t} \\ -(2yFwd_{CA,1m-t}^{t} - 2yFwd_{CA,1m}^{0}) \times \\ 2yPV01_{CA,1m-t}^{t} \times \frac{10yPV01_{CA,1m}^{0}}{2yPV01_{CA,1m}^{0}} \end{bmatrix} - TC_{CA} \right| \right) \right\}$$

For any Calculation Period, $\text{Index}_{CA, Final}$ shall be equal to $\text{Index}_{CA, t}$ where t is the Final Fixing Date for such Calculation Period.

For the purpose of evaluating whether a Suspension Event should occur the $\text{Index}_{CA}$ may be valued intra-day by the Calculation Agent using current market data at the time to calculate the swap rates, but following the same formula and methodology as above.

$TC_{CA}$

The Transaction Costs will be charged based on the cost of rolling the position from one Calculation Period to another and the cost of implementing/unwinding new positions from one Calculation Period to another.

i) If the sign of $\text{Signal}_{CA}^{Previous}$ is different from the sign of $\text{Signal}_{US}$:

$$TC_{CA} = |\text{Signal}_{CA} - \text{Signal}_{CA}^{Previous}| \times 0.0050\% \times 10yPV01_{CA,1m}^{0}$$

ii) Otherwise, $$TC_{CA} = \left\{ \begin{array}{l} \min(|\text{Signal}_{CA}|; |\text{Signal}_{CA}^{Previous}|) \times 0.0010\% + \\ |\text{Signal}_{CA} - \text{Signal}_{CA}^{Previous}| \times 0.0050\% \end{array} \right\} \times 10yPV01_{CA,1m}^{0}$$

Where $\text{Signal}_{CA}^{Previous}$ is equal to $\text{Signal}_{CA}$ for the previous Calculation Period (or zero in the case of the Initial Calculation Period).

$\text{Signal}_{CA}$

For any Calculation Period, the value of the CA Global COMPASS signal calculated on or about [08:00 am London time] by the Calculation Agent one CA Business Day before the Initial Fixing Date.

Initial Fixing Date

For any Calculation Period, the Final Fixing Date of the preceding Calculation Period subject to adjustment with the Following CA Business Day Convention.

Final Fixing Date

For any Calculation Period, the last Index Business Day of such Calculation Period.

Forward Start Date$_{CA}$

For any Calculation Period, the day that is one month following the Initial Fixing Date for such Calculation Period subject to adjustment with the Following CA Business Day Convention.

$10yFwd_{CA,1m}^{0}$

For any Calculation Period, the forward rate for a semi-annual CAD swap transaction with a maturity of 10 years on a 30/360 basis and with an effective date on the Forward Start Date, to be calculated by the Calculation Agent with reference to market data observed as of 11:00 am New York Time on the Initial Fixing Date.

$10yFwd_{CA,1m-t}^{t}$

For any Index Business Day t during a Calculation Period (to and including the Final Fixing Date), the forward rate for a semi-annual CAD swap transaction with a maturity of 10 years on a 30/360 basis and with an effective date on the Forward Start Date, to be calculated by the Calculation Agent with reference to market data observed as of 11:00 am New York Time on such day.

For any Index Business Day t which is not a CA Business Day, $10yFwd_{CA,1m-t}^{t}$ will be equal to $10yFwd_{CA,1m-(t-1)}^{(t-1)}$.

$2yFwd_{CA,1m}^{0}$

For any Calculation Period, the forward rate for a semi-annual CAD swap transaction with a maturity of 2 years on a 30/360 basis and with an effective date on the Forward Start Date, to be calculated by the Calculation Agent with reference to market data observed as of 11:00 am New York Time on the Initial Fixing Date.

$2yFwd_{CA,1m-t}^{t}$

For any Index Business Day t during a Calculation Period (to and including the Final Fixing Date), the forward rate for a semi-annual CAD swap transaction with a maturity of 2 years on a 30/360 basis and with an effective date on the Forward Start Date, to be calculated by the Calculation Agent with reference to market data observed as of 11:00 am New York Time on such day.

For any Index Business Day t which is not a CA Business Day, $2yFwd_{CA,1m-t}^{t}$ will be equal to $2yFwd_{CA,1m-(t-1)}^{(t-1)}$.

$10yPV01_{CA,1m}^{0}$

For any Calculation Period, the present value in CAD of CAD 1 per annum paid semi-annually, 30/360, unadjusted, following, from and including the Forward Start Date for such Calculation Period to but excluding the maturity date of such $10yFwd_{CA,1m}^{0}$ as determined by the Calculation Agent with reference to market data observed as of 11:00 am New York Time on the Initial Fixing Date.

$10yPV01_{CA,1m-t}^{t}$

For any Index Business Day t during a Calculation Period, the present value in CAD of CAD 1 per annum paid semi-annually, 30/360, unadjusted, following from and including the Forward Start Date for such Calculation Period to but excluding the maturity date of such $10yFwd_{CA,1m}^{0}$ as determined by the Calculation Agent with reference to market data observed as of 11:00 am New York Time on that day.

For any Index Business Day t which is not a CA Business Day, $10yPV01_{CA,1m-t}^{t}$ will be equal to $10yPV01_{CA,1m-(t-1)}^{(t-1)}$.

$2yPV01_{CA,1m}^{0}$

For any Calculation Period, the present value in CAD of CAD 1 per annum paid semi-annually, 30/360, unadjusted, following, from and including the Forward Start Date for such Calculation Period to but excluding the maturity date of such $2yFwd_{CA,1m}^{0}$ as determined by the Calculation Agent with reference to market data observed as of 11:00 am New York Time on the Initial Fixing Date.

$2yPV01_{CA,1m-t}^{t}$

For any Index Business Day t during a Calculation Period, the present value of 0.01% paid semi-annually, 30/360, unadjusted, following from and including the Forward Start Date for such Calculation Period to but excluding the maturity date of such $2yFwd_{CA,1m}^{0}$ as determined by the Calculation Agent with reference to market data observed as of 11:00 am New York Time on that day.

For any Index Business Day t which is not a CA Business Day, $2yPV01_{CA,1m-t}^{t}$ will be equal to $2yPV01_{CA,1m-(t-1)}^{(t-1)}$.

CA Business Days

Toronto.

Global COMPASS Signals

As explained above, the Global COMPASS Index aims to capture the changes in the slope of swap curves. The underlying strategies are steepeners or flatteners on the slope of the six swap curves of the largest financial geographies: United States (US), Euro-area (EU), Japan (JN), United Kingdom (UK), Canada (CA), Australia (AU).

Following the calculation of weekly signals based on the dynamics of the different monetary policy regimes, steepener or flattener positions are implemented in the respective curves. Sub-indices for the various geographies are created. The returns of each of these sub-indices, with weights based on relative GDP figures, determine the returns of the Global COMPASS Index.

$MP_{i,t}$

The Monetary Policy Indicator aims to assess the current local monetary policy regime (tightening vs. easing cycles) through the past quarter change in the Central Bank target rate—easing regimes are when there is considerable steepening of the yield curve.

For any Business Day, t, the Monetary Policy Signal for Currency$_i$, $MP_{i,t}$ should be equal to:

$$MP_{i,t} = \begin{array}{ll} -1 & \text{if } R_i(t) > R_i(t-3m) \\ +1 & \text{otherwise} \end{array}$$

Where:

$R_i(t)$ is defined as the value of the Central Bank Rate, on day t subject to adjustment with the Preceding Business Day i Convention as determined by the Calculation Agent with reference to Bloomberg Page$_i$ R$_i$(t−3m) is defined as the value of the Central Bank Rate, on a day that is 3 months prior to day t subject to adjustment with the Business Day i Convention as determined by the Calculation Agent.

MS$_{i,t}$

The Monetary Policy Surprise Indicator identifies the recent surprises in monetary policy by the comparison of short rates priced in by forwards with actual realized short rates.

For any Business Day$_i$ t, the Monetary Policy Surprise Signal for Currency$_i$, MS$_{i,t}$ should be equal to:

$$MS_{i,t} = -1 \text{ if } N_{suprise,i}(t) > 0$$
$$0 \text{ if } N_{suprise,i}(t) = 0$$
$$+1 \text{ if } N_{suprise,i}(t) < 0$$

$P_{suprise,i}(t)$ $3mFwd_{i,3m}^{t-3m} - 3mLibor_i^t$ $N_{suprise,i}(t)$

For any Business Day$_i$ t, the normalised rate change N$_{surprise,i}$ (t) is defined as:

$N_{surprise,i}(t)=(P_{surprise,i}(t)-\text{Average}\{P_{surprise,i}(t)\}/\text{Standard Deviation}\{P_{surprise,i}(t)\})$ Where both the Average and Standard Deviation is computed from and excluding the day that is 10 years before day t subject to adjustment with the Business Day i Convention to and including such day t.

3mLibor$_i^t$

For any Business Day$_i$ t, the rate for deposits in Currency$_i$ for a period of 3 months on such day t.

3mFwd$_{i,3m}^{t-3m}$

For any Business Day, t, the 3-month forward rate for a 3-month deposit calculated by the Calculation Agent.

Signal$_{i,t}$

For any Business Day$_i$ t, Signal$_{i,t}$ is defined as the average of the Local Monetary Policy Signal (MP$_{i,t}$), the US Monetary Policy Signal (MP$_{1,t}$) and the Local Monetary Policy Surprise (MS$_{i,t}$):

Signal$_{i,t}$=⅓×(MP$_{i,t}$+MP$_{1,t}$+MS$_{i,t}$)

TABLE 11

Other Definitions

| i | Currency$_i$ | Business Day$_i$ | Central Bank Rate: R$_i$ | Bloomberg Page$_i$ |
|---|---|---|---|---|
| 1 | USD | New York | Fed Funds Target Rate | FDTR Index |
| 2 | EUR | Target | ECB Minimum Bid Refinancing Rate | EURR002W Index |
| 3 | JPY | Tokyo | BoJ Target | BOJDTR Index |
| 4 | GBP | London | UK Base Rate | UKBRBASE Index |
| 5 | CAD | Toronto | BoC Overnight Lending Rate | CABROVER Index |
| 6 | AUD | Sydney | RBA Cash Target Rate | RBACTRD Index |

Figure 16:
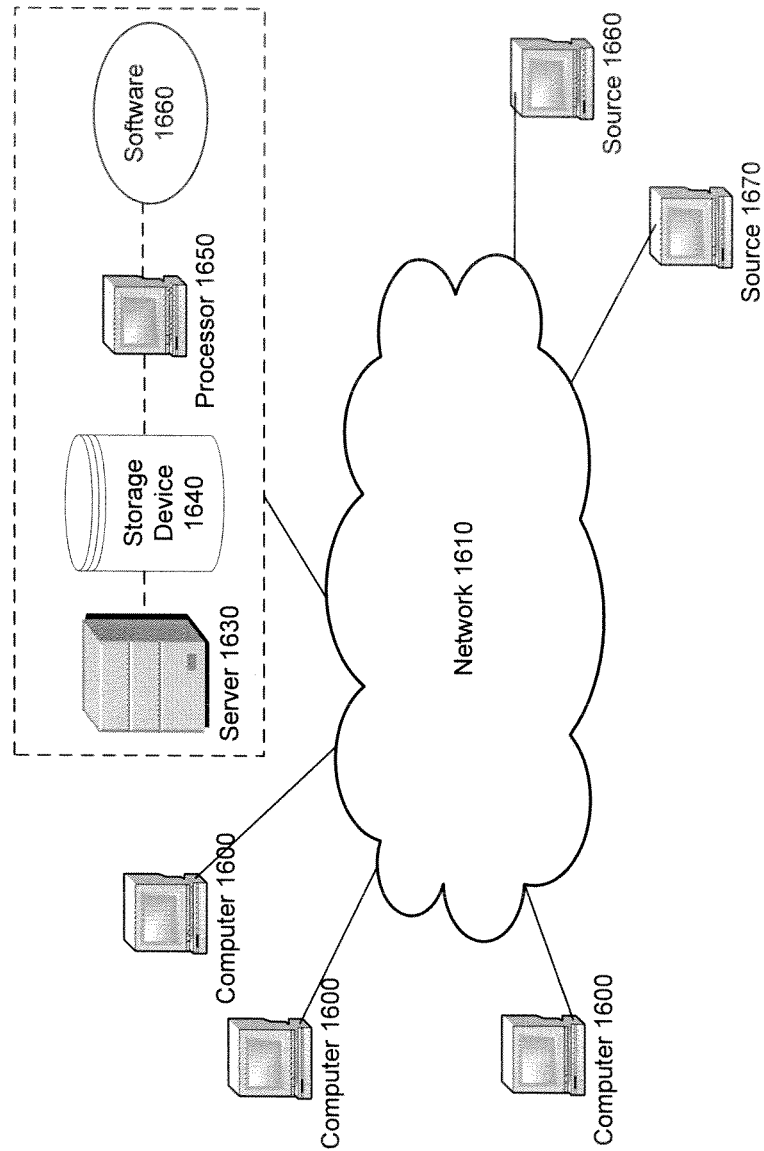
FIG. 16 depicts a computer based system for processing data according to an embodiment of the invention.

Embodiments of the present invention comprise computer components and computer-implemented steps that will be apparent to those skilled in the art. For example, calculations and communications can be performed electronically. An exemplary system is depicted in FIG. 16. As shown, computers 1600 communicate via network 1610 with a central server 1630. A plurality of sources of data 1660, 1670 relating to, for example, trading volume data, also communicate via network 1610 with a central server 1630, processor 1650, and/or other component to calculate and transmit, for example, volume forecast data. The server 1630 may be coupled to one or more storage devices 1640, one or more processors 1650, and software 1660.

Other components and combinations of components may also be used to support processing data or other calculations described herein as will be evident to those skilled in the art. Server 1630 may facilitate communication of data from a storage device 1640 to and from processor 1650, and communications to computers 1600. Processor 1650 may optionally include local or networked storage (not shown) which may be used to store temporary information. Software 1660 can be installed locally at a computer 1600, processor 1650 and/or centrally supported for facilitating calculations and applications.

For ease of exposition, not every step or element of the present invention is described herein as part of a computer system and/or software, but those skilled in the art will recognize that each step or element may have (and typically will have) a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the description and/or claims could be the same processor. All such combinations are within the scope of the invention.

Alternatively, the processing and decision steps described herein can be performed by functionally equivalent circuits such as a digital signal processor circuit or an application specific integrated circuit. The details described herein do not specify the syntax of any particular programming language, but rather provide sufficient functional information to enable one of ordinary skill in the art to perform the functions/processes in accordance with the present invention. It should be noted that many routine program elements, such as initialization of loops and variables and the use of temporary variables are not shown herein since they are already well-understood by those skilled in the art. Such elements will be nevertheless be understood to be part of corresponding embodiments by those skilled in the art.

It will be appreciated by those of ordinary skill in the art that unless otherwise indicated herein, the particular sequence of steps described is illustrative only and can be varied without departing from the scope of the invention.

The present invention has been described by way of example only, and the invention is not limited by the specific embodiments described herein. As will be recognized by those skilled in the art, improvements and modifications may be made to the invention and the illustrative embodiments described herein without departing from the scope or spirit of the invention.

What is claimed is:

1. A non-transitory computer readable storage medium having stored thereon computer executable instructions which, when executed on a computer, configure the computer to perform a method comprising:
   receiving data regarding bank rates and swap rates for two or more currencies;
   receiving data regarding one or more monetary policy regimes;
   calculating a swap curve for each of said two or more currencies;
   assigning a numerical monetary policy indicator to each of the one or more monetary policy regimes;
   calculating one or more signals for each of said swap curves based on the numerical monetary policy indicators assigned to the one or more monetary policy regimes; and
   based on said one or more signals, selecting a position with respect to each of said swap curves, wherein selecting the position includes selecting an investment strategy with respect to each of said swap curves.

2. The non-transitory computer readable storage medium of claim 1, further comprising calculating a sub-index value for each of said currencies, said sub-index values based on returns for said positions.

3. The non-transitory computer readable storage medium of claim 2, further comprising weighting each of said sub-index values and calculating a value for an index, based on a combination of said sub-index values.

4. The non-transitory computer readable storage medium of claim 3, wherein said weighting is based on relative gross domestic product values.

5. The non-transitory computer readable storage medium of claim 3, further comprising:
   calculating a performance value for said index to be used in a derivative based on said index; and
   calculating an amount due to, or owed by, an investor in said derivative, based on said performance value.

6. The non-transitory computer readable storage medium of claim 5, wherein said derivative is a total return swap.

7. The non-transitory computer readable storage medium of claim 5, wherein said derivative combines a floating rate investment of limited duration risk with a leveraged exposure to said index.

8. The non-transitory computer readable storage medium of claim 5, wherein said derivative comprises a liability structure.

9. The non-transitory computer readable storage medium of claim 5, wherein said derivative comprises a constant proportion portfolio insurance note.

10. The non-transitory computer readable storage medium of claim 5, wherein said derivative comprises a Euro medium term note.

11. The non-transitory computer readable storage medium of claim 5, wherein said derivative comprises a UCITS-compliant note.

12. The non-transitory computer readable storage medium of claim 1, wherein each of said one or more signals is based on an average of a plurality of numerical monetary policy indicators.

13. The non-transitory computer readable storage medium of claim 12, wherein each of said numerical monetary policy indicators has the value +1 or −1.

14. The non-transitory computer readable storage medium of claim 12, wherein at least one of said numerical monetary policy indicators is based on change in central bank target rate for a corresponding currency over a specified period of time.

15. The non-transitory computer readable storage medium of claim 12, wherein at least one of said numerical monetary policy indicators is a monetary policy surprise indicator.

16. The non-transitory computer readable storage medium of claim 1, wherein each swap curve is based on data for a plurality of swap rates.

17. The non-transitory computer readable storage medium of claim 16, wherein said data for said plurality of swap rates comprises 10 year swap rate data and 2 year swap rate data.

18. The non-transitory computer readable storage medium of claim 1, wherein each of said one or more signals is calculated on a weekly basis.

19. The non-transitory computer readable storage medium of claim 1, wherein said currencies comprise United States dollar, Euro, British pound, Japanese yen, and Canadian dollar.

20. The non-transitory computer readable storage medium of claim 1, wherein selecting a position includes selecting a steepener investment strategy or a flattener investment strategy with respect to each of said swap curves.

21. A system comprising:
   memory operable to store at least one program; and
   at least one processor communicatively coupled to the memory, in which the at least one program, when executed by the at least one processor, causes the at least one processor to:
   access and process data regarding bank rates and swap rates for two or more currencies;
   access and process data regarding one or more monetary policy regimes;
   calculate a swap curve for each of said two or more currencies;
   assign a numerical monetary policy indicator to each of the one or more monetary policy regimes;
   calculate one or more signals for each of said swap curves based on the numerical monetary policy indicators assigned to the one or more monetary policy regimes; and
   based on said one or more signals, select a position with respect to each of said swap curves, wherein selecting the position includes selecting an investment strategy with respect to each of said swap curves.

22. The system of claim 21, wherein the at least one processor is further cause to calculate a sub-index value for each of said currencies, said sub-index values based on returns for said positions.

23. The system of claim 22, wherein the at least one processor is further caused to weight each of said sub-index values and calculate a value for an index, based on a combination of said sub-index values.

24. The system of claim 23, wherein said weighting is based on relative gross domestic product values.

25. The system of claim 23, wherein the at least one processor is further caused to
   calculate a performance value for said index to be used in a derivative based on said index; and
   calculate an amount due to, or owed by, an investor in said derivative, based on said performance value.

26. The system of claim 25, wherein said derivative is a total return swap.

27. The system of claim 25, wherein said derivative combines a floating rate investment of limited duration risk with a leveraged exposure to said index.

28. The system of claim 25, wherein said derivative comprises a liability structure.

29. The system of claim 25, wherein said derivative comprises a constant proportion portfolio insurance note.

30. The system of claim 25, wherein said derivative comprises a Euro medium term note.

31. The system of claim 25, wherein said derivative comprises a UCITS-compliant note.

32. The system of claim 21, wherein each of said one or more signals is based on an average of a plurality of numerical monetary policy indicators.

33. The system of claim 32, wherein each of said numerical monetary policy indicators has a value +1 or −1.

34. The system of claim 32, wherein at least one of said numerical monetary policy indicators is based on change in central bank target rate for a corresponding currency over a specified period of time.

35. The system of claim 32, wherein at least one of said numerical monetary policy indicators is a monetary policy surprise indicator.

36. The system of claim 32, wherein selecting a position includes selecting a steepener investment strategy or a flattener investment strategy with respect to each of said swap curves.

37. The system of claim 21, wherein each swap curve is based on data for a plurality of swap rates.

38. The system of claim 37, wherein said data for said plurality of swap rates comprises 10 year swap rate data and 2 year swap rate data.

39. The system of claim 21, wherein each of said one or more signals is calculated on a weekly basis.

40. The system of claim 21, wherein said currencies comprise United States dollar, Euro, British pound, Japanese yen, and Canadian dollar.

* * * * *